United States Patent [19]

Takahashi

[11] Patent Number: 5,517,625

[45] Date of Patent: May 14, 1996

[54] SYSTEM BUS CONTROL SYSTEM FOR MULTIPROCESSOR SYSTEM

[75] Inventor: Hajime Takahashi, Kawasaki, Japan

[73] Assignee: Fujitsu Limited, Japan

[21] Appl. No.: 142,918

[22] Filed: Oct. 29, 1993

[30] Foreign Application Priority Data

Oct. 30, 1992 [JP] Japan .................................. 4-292517

[51] Int. Cl.⁶ .................................................. G06F 13/00
[52] U.S. Cl. ........................................... 395/288; 395/726
[58] Field of Search ................................. 395/725, 325, 395/425, 275, 288, 726, 479

[56] References Cited

U.S. PATENT DOCUMENTS

| | | | |
|---|---|---|---|
| 4,587,609 | 5/1986 | Boudreau et al. | 395/725 |
| 4,984,153 | 1/1991 | Kregness et al. | 395/425 |
| 5,167,022 | 11/1992 | Bahr et al. | 395/325 |
| 5,269,005 | 12/1993 | Heil et al. | 395/725 |
| 5,353,414 | 10/1994 | Iida et al. | 395/325 |
| 5,442,755 | 8/1995 | Shibata | 395/288 |

FOREIGN PATENT DOCUMENTS

| | | |
|---|---|---|
| 59-174962 | 10/1984 | Japan . |
| 01-300365 | 12/1989 | Japan . |
| 03-232052 | 10/1991 | Japan . |

*Primary Examiner*—Glenn A. Auve
*Attorney, Agent, or Firm*—Staas & Halsey

[57] ABSTRACT

A system bus control system for a system has a plurality of first modules and at least one second module. The first and second modules are connected together via a system bus which is controlled by an arbiter receiving requests to use the system bus from the first and second modules. Each of the first modules includes a lock control signal supervising unit, a lock control signal outputting unit, a command outputting unit and a response receiving unit. Each of the second modules includes a lock control signal supervising unit, a source module information storing unit, a command receiving unit and a response outputting unit. The lock control is controlled by the first and second modules rather than the arbiter, which permits one of the first and second modules to use the system bus if the system bus is idle.

7 Claims, 25 Drawing Sheets

I : NOMAL STATE
L : LOCK CONTROL STATE

① LOCK CONTROL COMMAND IS DETECTED WHEN LOC IS ON
② LOC IS NEGATED

FIG.16

MEMORY WRITE ACCESS
(COMMAND)

| 00 | 07 | | 15 | | | | 23 | 31 |
|---|---|---|---|---|---|---|---|---|
| #1 | SID | #2 | DID | #3 | * | R | **** | BCT |

| MEM ADDRESS |
|---|
| MEM DATA (WRITE) 1ST WORD |
| MEM DATA (WRITE) 2ND WORD |
|  |
| MEM DATA (WRITE) NTH WORD |

(STATUS)

| 00 | 07 | | 15 | | | | 23 | 31 |
|---|---|---|---|---|---|---|---|---|
| #1 | SID | #2 | DID | #3 | ** | OPCD | ** | CSC |

FIG.17

MEMORY READ ACCESS
(COMMAND)

| 00 | 07 | 15 | 23 | 31 |
|---|---|---|---|---|
| #1 | SID | #2 | DID | #3 | * | R | **** | BCT |
| MEM ADDRESS ||||||||| |

(STATUS)

| 00 | 07 | 15 | 23 | 31 |
|---|---|---|---|---|
| #1 | SID | #2 | DID | #3 | ** | OPCD | ** | CSC |
| MEM DATA (READ) 1ST WORD ||||||||| |
| MEM DATA (READ) 2ND WORD ||||||||| |
|  ||||||||| |
| MEM DATA (READ) NTH WORD ||||||||| |

FIG.18

| OPCD | COMMAND TYPE |
|---|---|
| 0 0 0 | MEMORY ACCESS |
| 0 0 1 | (RESERVE) |
| 0 1 0 | (RESERVE) |
| 0 1 1 | REGISTER ACCESS |
| 1 0 0 | (RESERVE) |
| 1 0 1 | (RESERVE) |
| 1 1 0 | (RESERVE) |
| 1 1 1 | STATUS |

FIG.19

| O P C D | FLAG | COMMAND TYPE |
|---|---|---|
| 0 0 0 | | MEMORY ACCESS |
| 0 0 1 | | (RESERVE) |
| 0 1 0 | | (RESERVE) |
| 0 1 1 | | REGISTER ACCESS |
| 1 0 0 | | (RESERVE) |
| 1 0 1 | | (RESERVE) |
| 1 1 0 | 0 | LOCK MEMORY |
| 1 1 0 | 1 | LOCK DUMMY |
| 1 1 1 | | STATUS |

FIG.20

| 00 | 07 | 15 | | | 23 | | 31 |
|---|---|---|---|---|---|---|---|
| I SID | I DID | O | * | R | * * * * | F | BCT |

FIG.21

| RLN | MEANING |
|---|---|
| 0 0 0 0 | NOT DEFINED |
| 0 1 1 0 | INITIALIZING |
| 0 1 1 1 | IN HALT |
| 1 0 0 1 | HARDWARE ERROR |
| 1 0 1 0 | SEQUENCE ABNORMALITY |
| 1 0 1 1 | REJECT |
| 1 1 0 1 | BUFFER BUSSY |
| 1 1 1 0 | DACK |
| 1 1 1 1 | IACK |

SYSTEM BUS CONTROL SYSTEM FOR MULTIPROCESSOR SYSTEM

BACKGROUND OF THE INVENTION

1. Field of the Invention

The present invention generally relates to a system bus control system for a multiprocessor system including a plurality of processors.

2. Description of the Prior Art

A multiprocessor system includes a plurality of processors capable of performing respective processes in order to improve the performance of the overall system. Such a multiprocessor system needs a lock control among the processors in order to avoid collisions of access to one or a plurality of resources. Such a lock control can be realized by providing a lock control area in a shared memory (resource) which can be accessed by all the processors, and the right to use the resource is assigned on the basis of the contents of the lock control area. The above lock control using the lock control area absolutely requires that all the processors attempt to acquire the right to exclusively use the shared resource in the same procedures and the processors other than one processor having the exclusive right to use the shared resource do not interrupt execution of the process by the above processor.

More particularly, in the procedure for acquiring the right to exclusively use the resource, a processor reads an access condition for exclusive use. Information (for example, a flag) concerning such an access condition is stored in a register or a storage area connected to the system bus. For example, if the flag indicating the access condition is "0", no processors are using the shared resource. If the flag is "1", one of the processors is exclusively using the shared resource. A processor which requests to use the shared resource confirms that the flag is "0", and accesses the shared resource to write data therein. If an ordinary write access is applied to the flag area, the lock control cannot be established. Further, there is a possibility that two or more processors may simultaneously acquire the right to use the shared resource during the above sequence of reading the access condition, checking it and writing data into the shared resource. For example, when a processor checks the access condition, another processor has checked the access condition and has just started the write operation.

In order to eliminate the problem resulting from the hardware, a processor having a command specifically used for lock control is required. Such a processor asserts a signal indicating the lock control while the processor is executing a lock control command, and successively performs the condition read, check and write operations (in other words, the processor does not release the system bus or accept an interrupt request during the interval between the read and write operations) in order to prevent the other processors from generating interrupt requests.

More particularly, an arbiter performing an arbitration of accesses to the system bus supervises a lock control signal (LOC) indicative of the locking period and generated by a processor. While the lock control signal is being asserted, the arbiter does not accept command send requests from the other modules (processors) at all. While the lock control signal is being asserted, the other modules cannot issue commands at all, and thus the throughput of the overall system is low. That is, the arbiter allows only the module outputting the lock control signal to use the system bus and prevents the other modules from using the system bus.

However, in practice, the module which has acquired the exclusive use of the system bus uses the system bus intermittently, and the total of intervals during which the module does not use the system bus is great. Even when the module does not use the system bus, the other modules cannot use the system bus. Hence, the system bus is not efficiently used and the throughput of the overall system is low.

SUMMARY OF THE INVENTION

It is a general object of the present invention to provide a system bus control system in which the above disadvantage is eliminated.

A more specific object of the present invention is to make it possible for a module to use the system bus even when the right to use the system bus has been acquired by another module and to thereby efficiently use the system bus.

The above objects of the present invention are achieved as follows. A system bus control system for a system has a plurality of first modules and one or a plurality of second modules. The first and second modules are connected together via a system bus controlled by an arbiter receiving requests to use the system bus from the first and second modules. Each of the first modules includes a lock control signal supervising unit, a lock control signal outputting unit, a command outputting unit and a response receiving unit. Each of the second modules includes a lock control signal supervising unit, a source module information storing unit, a command receiving unit and a response receiving unit. The lock control is controlled by the first and second modules rather than the arbiter, which permits one of the first and second modules to use the system bus if the system bus is idle.

More particularly, the system bus control system comprises: first lock control signal supervising means, provided in each of the plurality of first modules, for supervising a lock control signal indicating that a lock control is being carried out; lock control signal outputting means, provided in each of the plurality of first modules, for outputting the lock control signal to the system bus; command outputting means, provided in each of the plurality of first modules, for outputting a lock control command and a non-lock (unlock) control command, the lock control command containing source module information indicating a source module outputting the lock control signal; and response receiving means, provided in each of the plurality of first modules, for receiving a response to the lock control command or the non-lock control command. The system further comprises second lock control signal supervising means, provided in the above one or plurality of second modules, for supervising the lock control signal; source module information storing means, provided in the above one or plurality of second modules, for storing the source module information; command receiving means, provided in the above one or plurality of second modules, for receiving the lock control command and the non-lock control command, a response outputting unit for outputting the response to the system bus; and control means, provided in the arbiter, for receiving the requests from the first and second modules and for permitting one of the first and second modules to use the system bus on the basis of a status of the system bus.

BRIEF DESCRIPTION OF THE DRAWINGS

Other objects, features and advantages of the present invention will become more apparent from the following detailed description when read in conjunction with the accompanying drawings, in which:

FIG. 16 is a diagram of a data format employed in the embodiment of the present invention;

FIG. 17 is a diagram of another data format employed in the embodiment of the present invention;

FIG. 18 is a diagram of a general command definition;

FIG. 19 is a diagram of a command definition employed in the embodiment of the present invention;

FIG. 20 is a block diagram of a format of a command added according to the embodiment of the present invention;

FIG. 21 is a diagram of a signal definition related to a response bus used in the embodiment of the present invention;

DESCRIPTION OF THE PREFERRED EMBODIMENTS

A description will now be given of a lock control system applied for a system bus related to the present invention.

Figure 1:
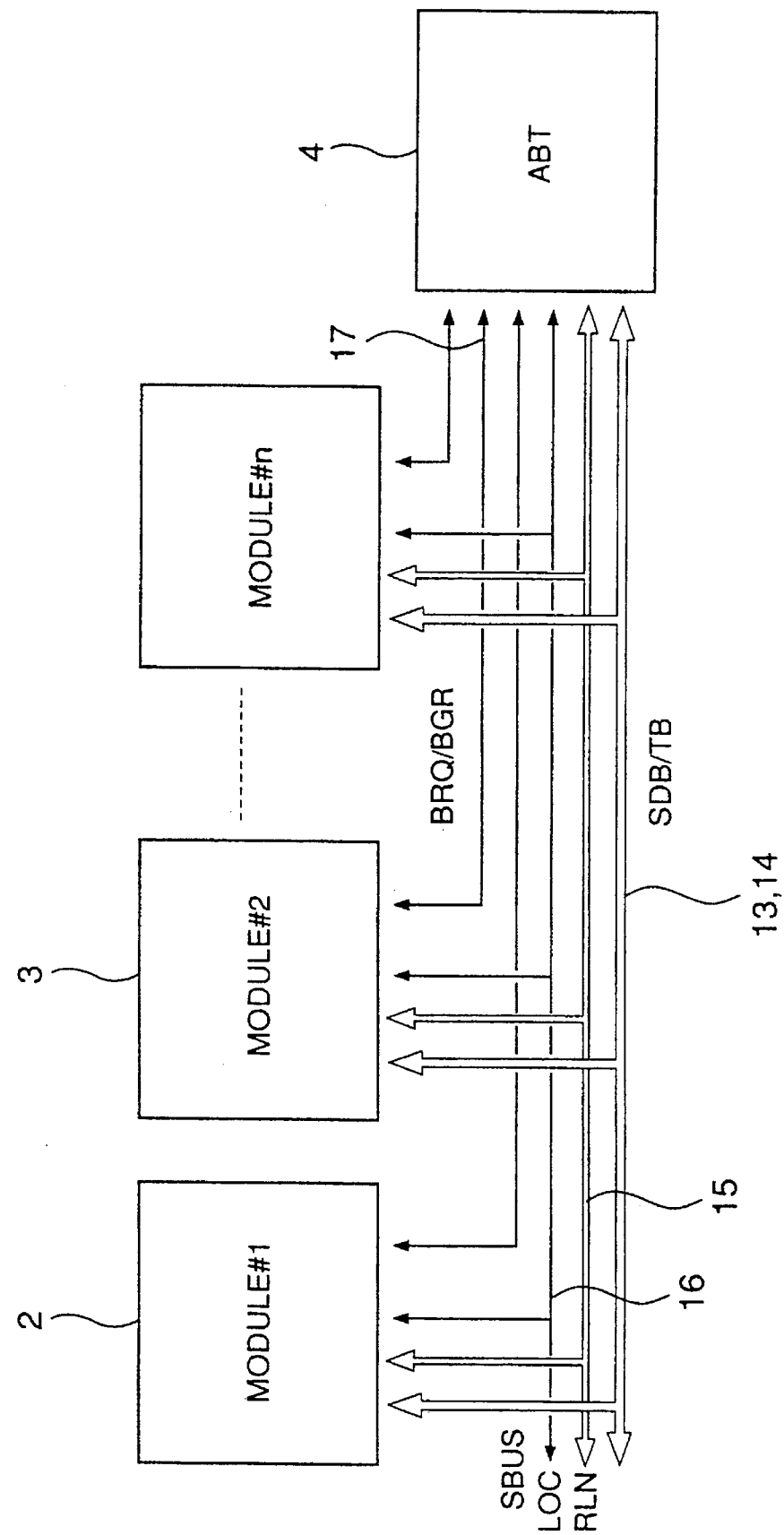
FIG. 1 shows a multiprocessor system related to the present invention.

FIG. 1 shows a multiprocessor system, in which a plurality of modules 2 (#1), 3 (#2), . . . are connected together via a system bus (SBUS) 1 controlled by an arbiter (ABT) 4. Data transfers between the modules are carried out in such a manner that a source module having a request to send data to a destination module sends a command to the destination module, which executes the received command and sends back a status signal to the source module. The system bus 1 is made up of a system data bus (SDB) 13, a tag bus (TB) 14, a response line (RLN) 15, a lock control indication signal line (LOC) 16, and a use request/permission bus 17. The system data bus 13 carries data in both directions. The tag bus 14 is a two-way bus and indicates the contents of the data transferred via the system data bus 13. The response line 15 is a two-way line and is used to transfer information indicating a transfer state in synchronism with transmission of a command or status signal. The lock control indication signal line 16 is a two-way line and transfers a signal indicating that processor modules among the modules are performing the lock control. The use request/permission bus 17 includes a group of lines used to carry bus use request signals (BRQ) and bus use permission signals (BGR), these signals being transferred between the modules and the arbiter 4.

The bus use request signals switch between a low level and a high level, in which the low level indicates a request for transmission of a command, and the high level indicates a request for transmission of the status signal. The arbiter 4 processes the bus use request signals so that the high-level request has priority over the low-level request. The bus use permission signals switch between a master state (master signal) and a slave state (slave signal). When the arbiter 4 permits a module requesting to use the data bus 13 to use it, the arbiter 4 sends the master signal to the above module, which is allowed to drive the data bus 13 and the tag bus 14. The arbiter 4 identifies the destination module from a command issued by the module which has been allowed to use the data bus 13, and sends the slave signal to the destination module. Upon receipt of the slave signal, the destination module drives the response line 15, and reports the status of receipt to the arbiter 4 in synchronism with the command. The function of some modules does not require use of the bus use request. For example, memory modules do not issue any commands, and the bus use requests are not used for these modules.

Figure 2:
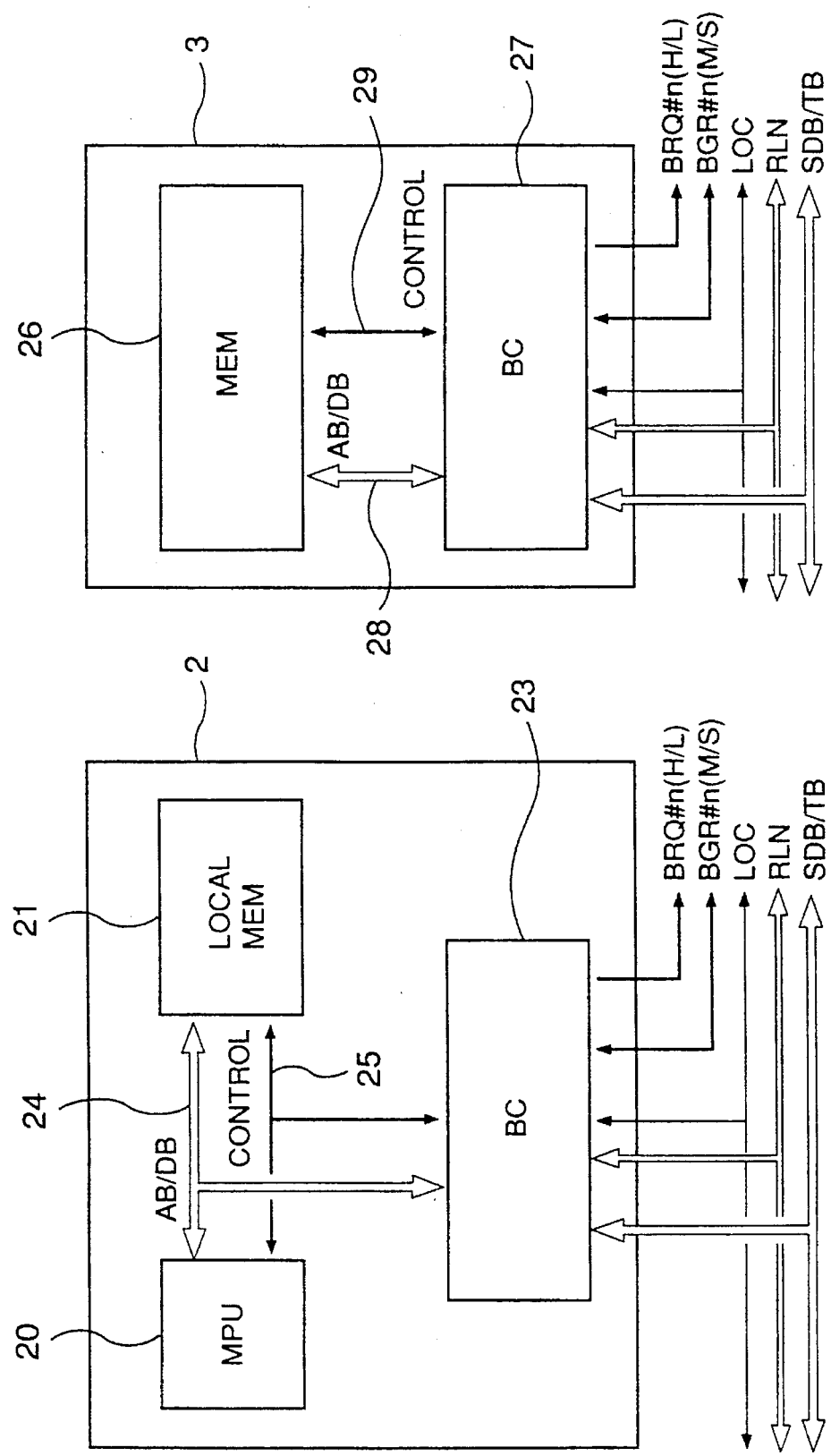
FIG. 2 is a block diagram of a processor module and a memory module among the modules shown in FIG. 1.

FIG. 2 shows the structures of the modules 2 and 3, in which the module 2 is a processor module and the module 3 is a memory module. The processor module 2 is made up of an MPU (MicroProcessor Unit) 20, a local memory 21, and a bus controller (BC) 23. The local memory 21 stores programs executed by the MPU 20. The bus controller 23 establishes an interface between the processor module 2 and the system bus 1. The MPU 20, the local memory 21 and the bus controller 23 are connected together via an address bus (AB)/data bus (DB) 24, and a control signal line (CONTROL) 25. The memory module 3 is made up of a memory 26 and a bus controller (BC) 27, which are connected together via an address bus (AD)/data bus (DB) 28 and a control signal line (CONTROL) 29.

Figure 3:
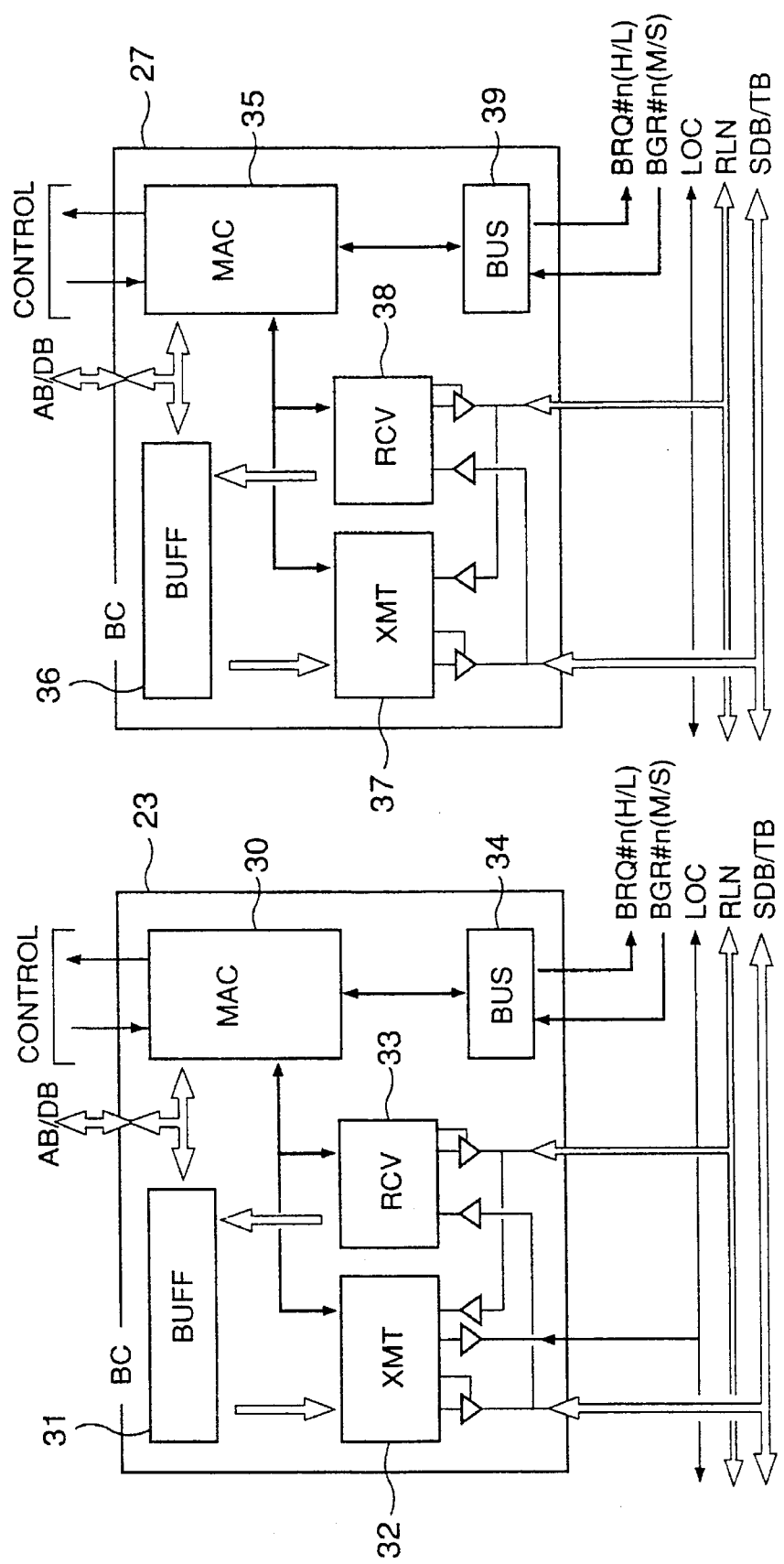
FIG. 3 is a block diagram of a bus controller of the processor module and a bus controller of the memory module shown in FIG. 2.

FIG. 3 shows the structures of the bus controllers 23 and 27 respectively provided in the processor module 2 and the memory module 3 shown in FIG. 2. Strictly speaking, the bus controllers 23 and 27 have slightly different structures due to the functions of the processor module 2 and the memory module 3. However, basically, the bus controllers 23 and 27 are respectively made up of MACs (Memory Access Controllers) 30 and 35, buffers (BUFF) 31 and 36, transmitters (XMT) 32 and 37, receivers (RCV) 33 and 38, and bus arbitration units (BUS) 34 and 39. The memory access controllers 30 and 35 control respective internal interfaces. The buffers 31 and 36 are used to temporarily store data sent to or from the memories 21 and 26 and the MPU 20. The transmitters 32 and 37 generate command and status signals and send to the system bus 1. The receivers 33 and 38 receive the command and status signals from the system bus 1. The bus arbitration units 34 and 39 carry out a bus arbitration control in cooperation with the arbiter 4. The bus controller 27 differs from the bus controller 27 in that the transmitter 32 of the processor module 2 has the function of driving the lock control signal (LOC) while the transmission unit 37 of the memory module 3 does not have the function of driving the lock control signal (LOC).

Figure 4:
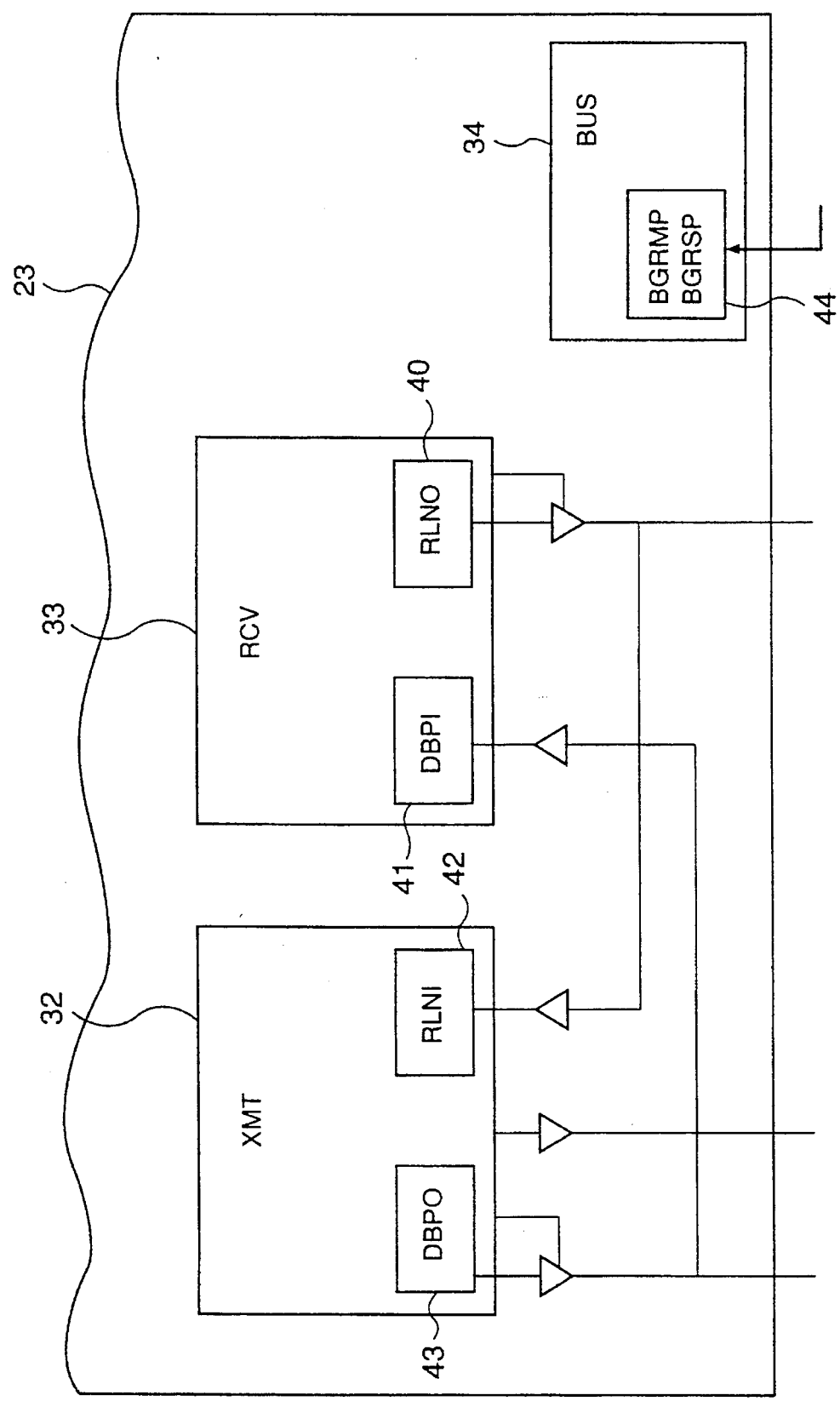
FIG. 4 is a block diagram showing a latch operation carried out on the bus controller of the processor module.

FIG. 4 shows an arrangement of latches provided in the transmitters 32 and 37, the receivers 33 and 38 and the bus arbitration units 34 and 39.

Figure 5:
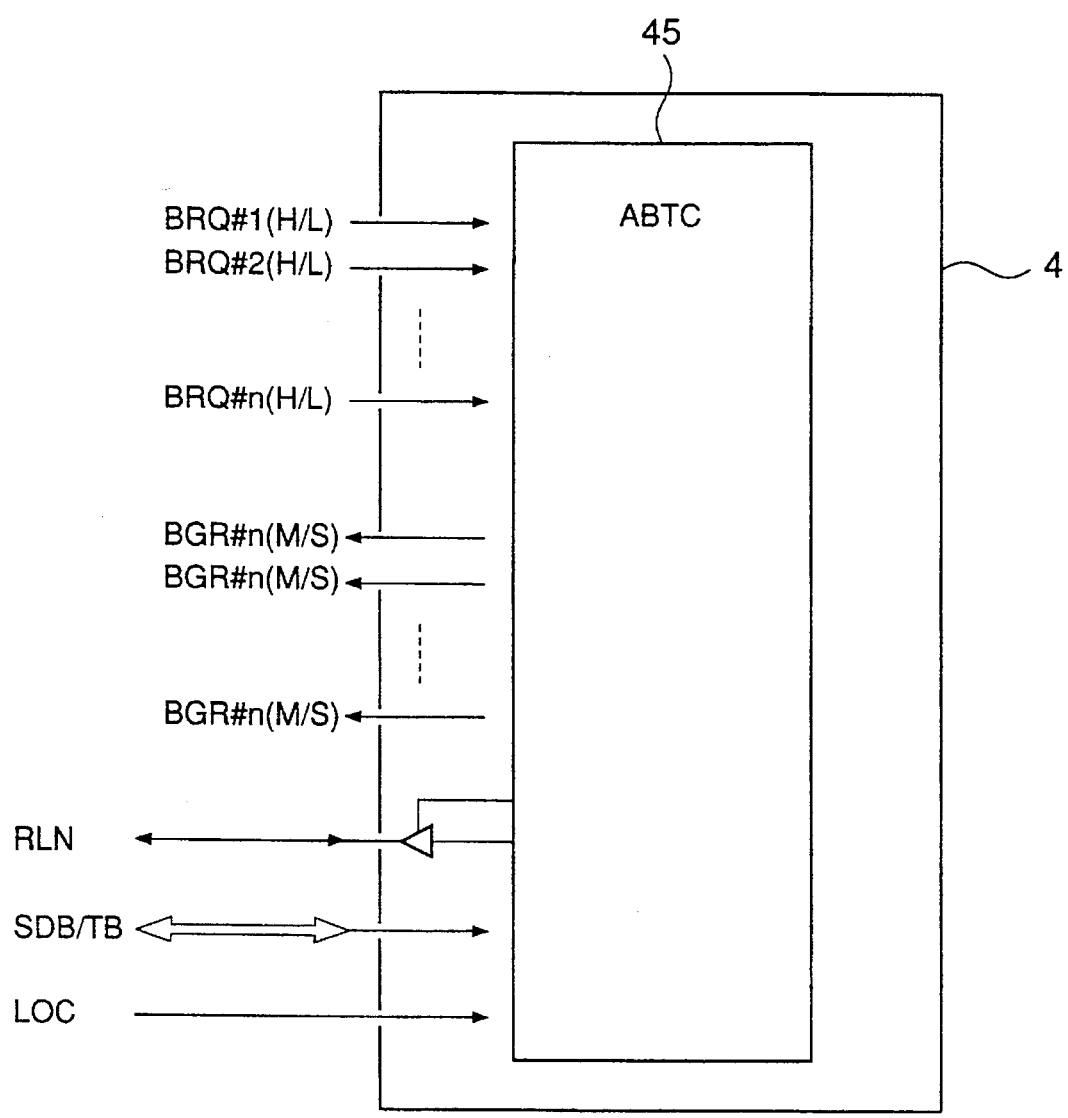
FIG. 5 is a block diagram of an arbiter shown in FIG. 1.

FIG. 5 shows signals handled by the arbiter 4, which includes an arbiter controller (ABTC) 45. The arbiter controller 45 receives the bus use request signals from the modules. Then, the arbiter controller 45 selects one of the received request signals and sends the bus use permission signal (master signal) to the module which has generated the selected request signal. Further, the arbiter controller 45 identifies the destination module specified in a command issued, and sends the slave signal to the destination module, which is allowed to drive the response bus 15. If an abnormal state is detected, for example, when a parity error is detected in the transfer of the command, the arbiter controller 45 cannot identify the destination module, and drives the response bus 15 itself, so that information indicating a hardware error is output. Furthermore, the arbiter controller 45 supervises the lock control signal LOC, and continuously prevents the outputting of a command while detecting that the lock control signal LOC is being asserted. More particularly, at this time, the arbiter controller 45 does not accept any bus use request signals which are low-level signals.

Figure 6:
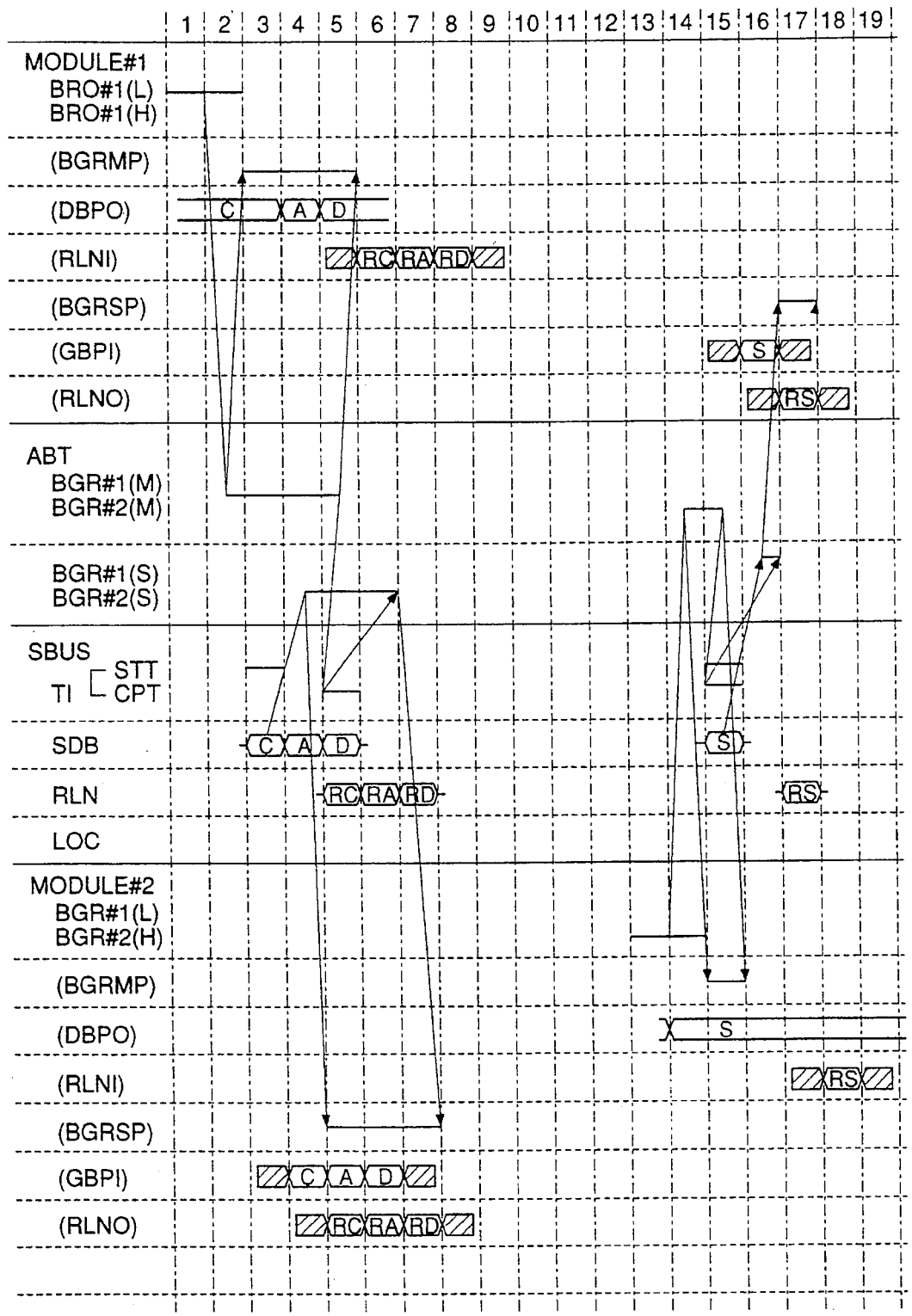
FIG. 6 is a sequence diagram of the operation of the system bus in the system related to the present invention.

A description will now be given, with reference to FIG. 6, of the operation of the system bus configured in the above-mentioned manner. In the following description, a case will be considered in which module #1 accesses module #2 to transfer data to module #2 (write operation). Module #1 asserts the bus use request signal BRQ#1(L) in order to send a command. The arbiter 4 receives the bus use request signal BRQ#1(L), and sends the bus use permission signal BGR#1(M) to module #1. Upon receipt of the bus use permission signal BGR#1(M), module #1 starts to drive the system data bus 13 and the tag bus 14, and simultaneously sends the address and data subsequent to the command. The tag bus 14 carries a starting signal STT and a complete signal CPT. The starting signal STT indicates the start of the bus operation, and the complete signal CPT indicates the end of data.

The arbiter 4 confirms the complete signal CPT, and negates the bus use permission signal BGR#1(M) with respect to module #1. Further, the arbiter 4 recognizes, by referring to tag bus information carried via the tag bus 14, that the command has been received, and reads the destination module information contained in the received command. Then, the arbiter 4 sends the bus use permission signal BGR#2(S) to the destination module (module #2). Module #2 drives the response bus (RLN) 15 upon receipt of the bus use permission signal BGR#2(S), and sequentially reports the status of receipt to the arbiter 4 in synchronism with a transfer of the command. Module #2 carries out an internal process upon receipt of the command, and generates information indicating the status of receipt from the results of the internal process.

In order to send the status information to module #1, module #2 asserts the bus use request signal BRQ#2(H) with respect to the arbiter 4. The arbiter 4 sends the bus use permission signal BGR#2(M) with respect to the received bus use request signal BRQ#2(H). Upon receipt of the bus use permission signal BGR#2(M), module #2 drives the buses 13 and 14 to send the status information to the arbiter 4. The arbiter 4 sends the bus use permission signal BGR#1(S) based on the status information to module #1 and thereby allows module #1 to use the response bus 15. In the above manner, a data transfer between the modules is carried out by transferring the command and status information therebetween. There are idle cycles of the system bus during the interval between the transfer of the command and the transfer of the status information. If the lock control signal LOC is not being output, the other modules can use the system bus. The bus of the above-mentioned type is called a split-type bus, and a higher throughput than the system bus is exclusively used for each access.

Figure 7:
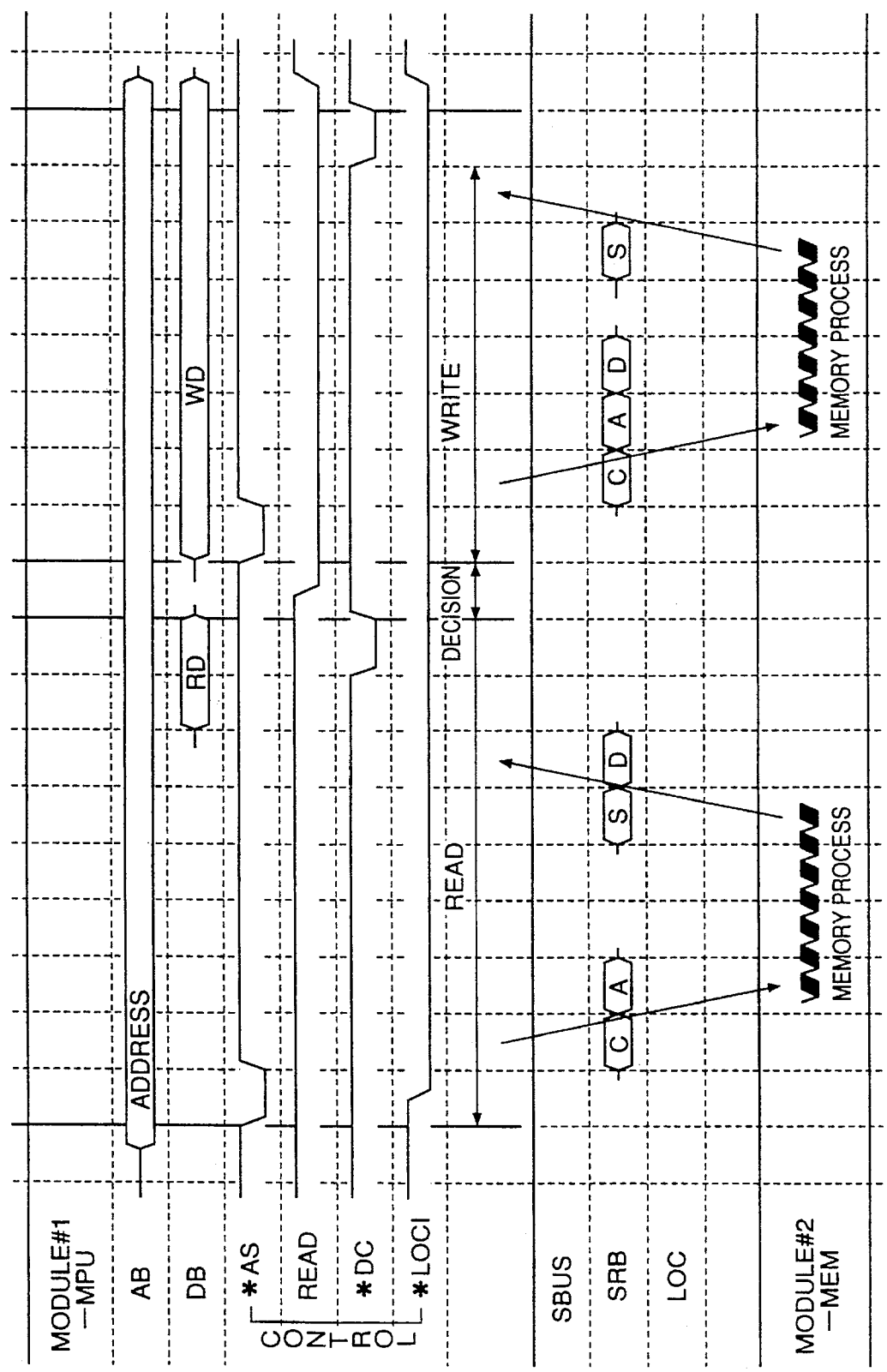
FIG. 7 is a sequence diagram of a lock control access in the system related to the present invention.

FIG. 7 shows a sequence of the lock control access. A case will be described where module #1 (processor module) accesses module #2 (memory module), as in the case shown in FIG. 6. Sequences related to module #1 shown in FIG. 7 show the internal bus operation. The MPU 20 settles an address related to the lock control access on the address bus AB, and then asserts an address strobe signal (*AS) in order to start the bus operation. The bus controller (BC) 23 recognizes that the above access is a read access to module #2, and generates a system bus command (C shown in FIG. 7). Subsequently, the bus controller 23 sends the address (A shown in FIG. 7), and waits for the status information from module #2. Since the MPU 20 asserts a signal (*LOCI) indicating the lock control access, the bus controller 23 sends a command and simultaneously asserts the lock control signal LOC.

The arbiter 4 detects that the lock control signal LOC is asserted. Then, the arbiter 4 does not accept any commands so long as the lock control signal LOC is being asserted. Upon receipt of the command, module #2 carries out an access (read) to the memory (MEM) 26, and generates status information from the result of the above access to the memory 26. Module #1 receives the status information and data from module #2. If the received status information does not indicate any error, the bus controller 23 settles the data on the data bus 24, and thereafter asserts the complete signal (*DC) indicating the completion of the bus operation with respect to the MPU 20. The MPU 20 receives the read data and makes a data decision. Then, the MPU 20 starts the write operation. The operation of the system bus is carried out in the same manner as has been described previously except that the direction in which data (D) is transferred is opposite to that shown in FIG. 6.

While one command (read modify write) of the MPU 20 is being carried out, the other modules are prevented from transmitting any commands via the system bus. Hence, it is possible to avoid collision of memory accesses and ensure the integrity of data. However, the throughput of the system bus is low because it is not allowed to transmit any commands while the lock control access is being carried out.

The present invention is intended to eliminate the above-mentioned problem.

Figure 8:
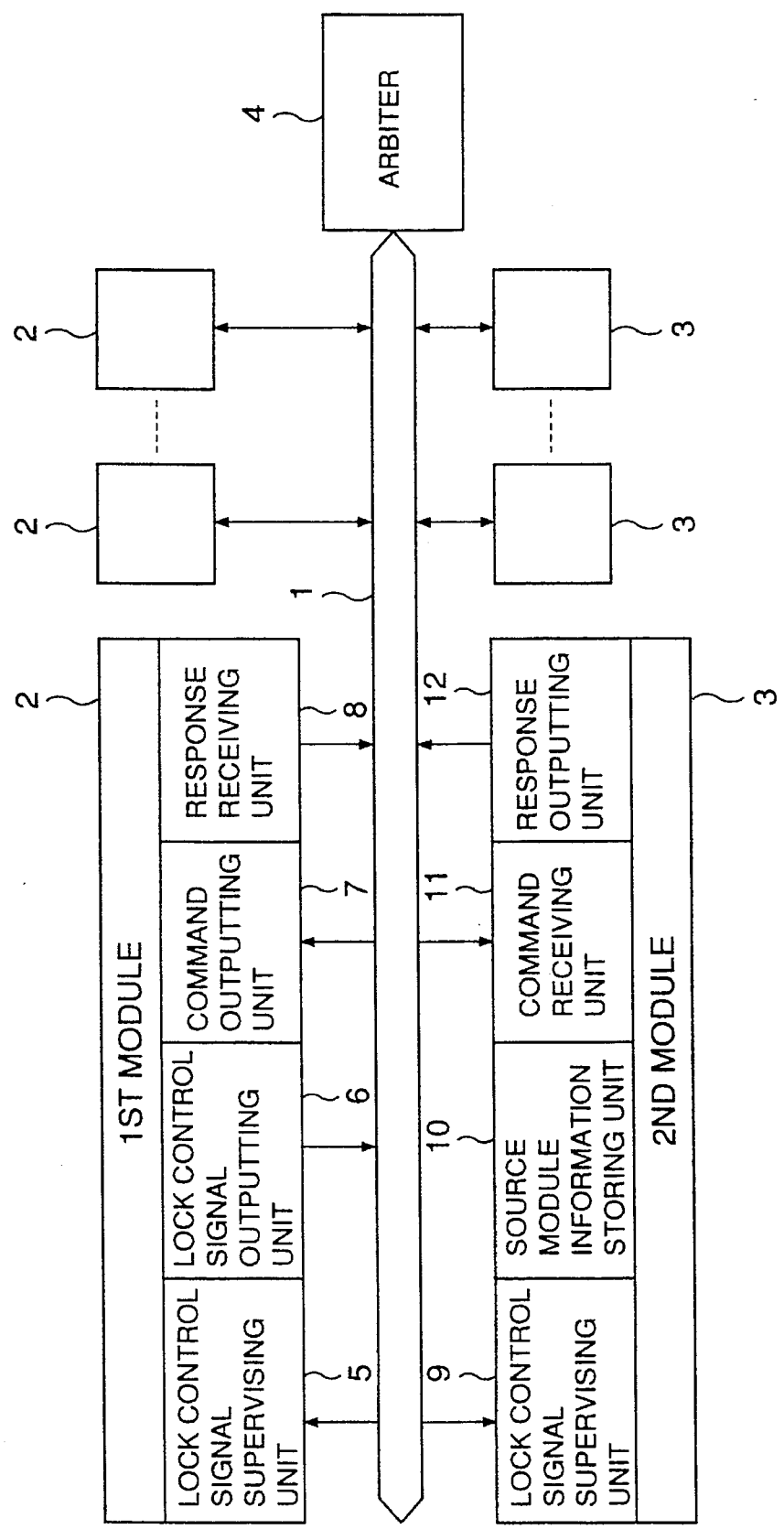
FIG. 8 is a block diagram of the principle of the present invention.

FIG. 8 shows the principle of the present invention. A plurality of first modules 2 and a plurality of second modules 3 are connected to the system bus 1, which is controlled by the arbiter 4. Each of the first modules 2 includes a lock control signal supervising unit 5, a lock control signal outputting unit 6, a command outputting unit 7 and a response receiving unit 8. Each of the second modules 3 includes a lock control signal supervising unit 9, a source module information storing unit 10, a command receiving unit 11 and a response outputting unit 12.

The lock control signal supervising unit 5 supervises the lock control signal indicating that the lock control is in progress. The lock control signal outputting unit 6 outputs the lock control signal. The command outputting unit 7 outputs a lock control command and a non-lock (unlock) control command. The lock control command can contain information indicating that the first module 2 provided in the command outputting unit 7 outputting the above lock control command is a source module. The response receiving unit 8 receives a response to the command generated by the command outputting unit 7. The lock control signal supervising unit 9 supervises the lock control signal. The source module information storing unit 10 stores information indicating the source module. The command receiving unit 11 receives the command output by the command outputting unit 7. The response outputting unit 12 outputs a response to the received command. When the arbiter 4 receives the bus use request signals from the first modules 2 and the second modules 3, the arbiter 4 sends the bus use permission signal to one of the modules on the basis of the status of use of the system bus 1.

The source module information storing unit 10 of each of the second modules 3 causes the lock control signal supervising unit 9 to hold the source module information contained in the first lock control command after the lock control signal is asserted until the above lock control signal is negated.

The command receiving unit 11 of each of the second modules 3 identifies the source module contained in the received lock control command, and rejects the lock control command if the identified source module does not coincide with the source module indicated by the source module information held in the source module information storing unit 10.

When the first modules 2, attempting to issue the lock control signals and the lock control commands, recognize, by means of the lock control signal supervising units 5, that the lock control signal has been issued by another module, the first modules 2 output dummy commands and prevent themselves from issuing the lock control signals.

The first modules 2 which have generated the dummy commands do not issue new lock control commands until the lock control signal which has been issued is negated.

In each of the first modules 2, the lock control signal supervising unit 5 confirms that there is no exclusive control signal on the system bus 1, and causes the lock control signal output unit 6 to output the lock control signal. Then, the bus use permission signal from the arbiter 4 is received, and the command outputting unit 7 outputs the lock control command. In each of the second modules 3, the lock control signal supervising unit 7 detects the lock control signal, and the command receiving unit 11 receives the lock control signal. Then, it is determined whether or not the source module contained in the received command coincides with the source module indicated by the information stored in the source module storing unit 10. If the result of the above determination is affirmative and the received lock control command is addressed to the second module 3 being considered, the above second module 3 executes the received command, and responds to the first module 2 being considered by means of the response outputting unit 12 after receiving the bus use permission signal for the system bus 1 from the arbiter 4. The response receiving unit 8 of the first module 2 receives the response signal from the second module 3. If the system bus 1 is idle during the above sequence and one of the modules outputs the non-lock control command, the arbiter 4 permits the above module to use the system bus 1 irrespective of whether the received command is the lock control command or the non-lock control command. Thus, the first module 2 or the second module 3 being considered can perform the non-lock control command. As a result, even while the lock control signal is being output, the system bus 1 can be used to perform the non-lock control command if the system bus 1 is idle. Hence, the throughput of the system bus 1 can be improved.

The source module storing unit 10 of each of the second modules 3 holds the source module information contained in the first lock control command after the lock control signal is asserted until the above lock control signal is negated. Hence, it becomes possible to identify the lock control command issued by one of the first modules 2 other than the first module 2 which has generated the above first lock control command.

The command receiving unit 11 of each of the second modules 3 identifies the source module contained in the received lock control command, and rejects the lock control command if the identified source module does not coincide with the source module indicated by the source module information held in the source module information storing unit 10. Thus, it is possible to prevent the lock control from being carried out by the other modules and hence ensure the lock control.

When the first modules 2 attempt to the lock control signals and the lock control commands recognize, by means of the lock control signal supervising units 5, that the lock control signal has been issued by another module, the first modules 2 output dummy commands and prevent themselves from issuing the lock control signals. Hence, it is possible to prevent the lock control signal from being double issued and ensure the lock control.

The first modules 2 which have generate the dummy commands does not issue new lock control commands until the lock control signal which has been issued is negated. Hence, it is possible to ensure the lock control.

Figure 9:
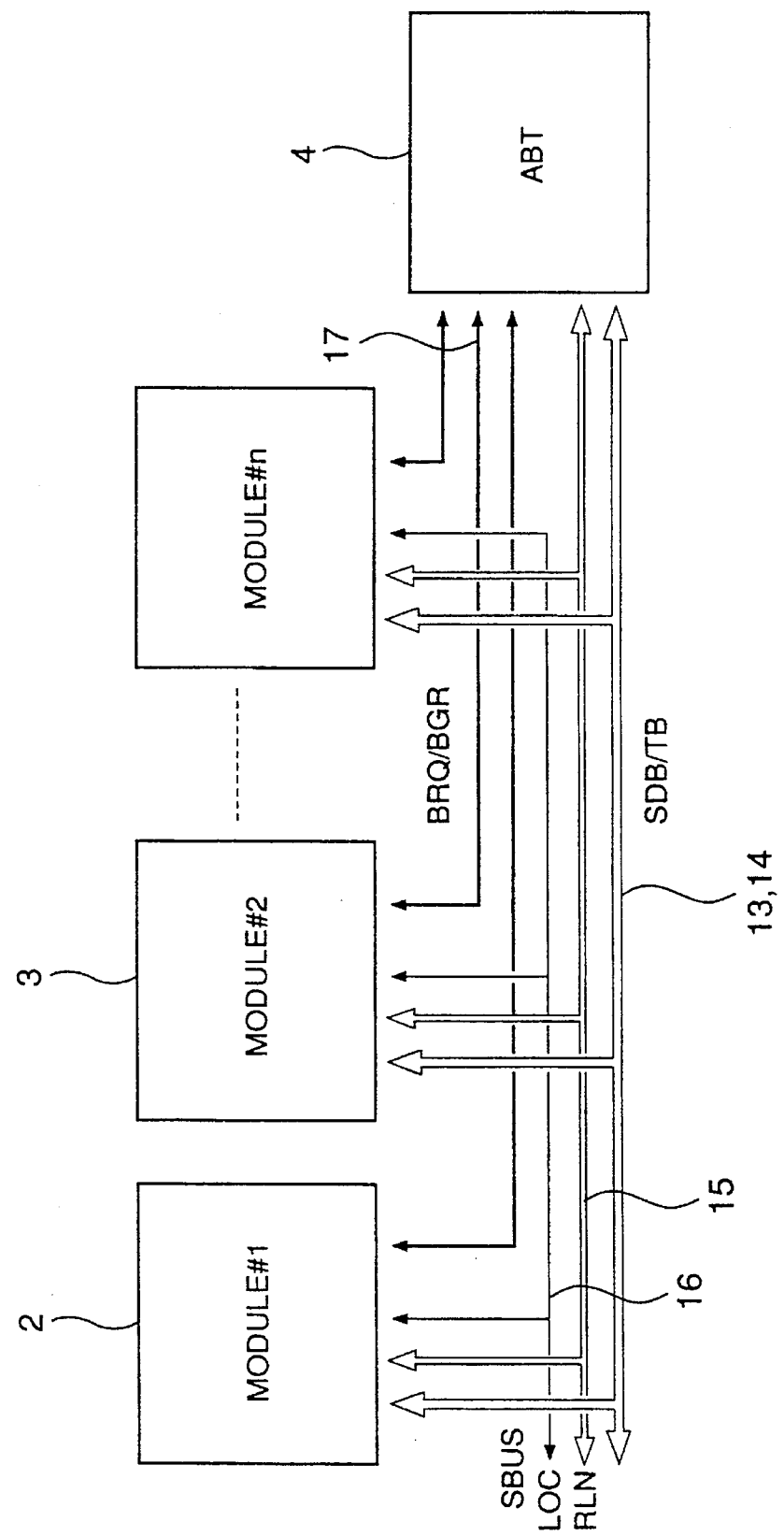
FIG. 9 is a block diagram of a system configuration according to an embodiment of the present invention.

A description will now be given of an embodiment of the present invention. FIG. 9 shows a system structure according to the embodiment of the present invention. In FIG. 9, parts that have the same names as those shown in the previously described figures are given the same reference numbers as previously. The system configuration shown in FIG. 9 differs from that shown in FIG. 1 in that the arbiter 4 shown in FIG. 9 does not consider the lock control signal LOC with respect to the bus use request signal, and issues the bus use permission signal if the system bus 1 is idle. Hence, the arbiter 4 shown in FIG. 9 does not handle the lock control.

Figure 10:
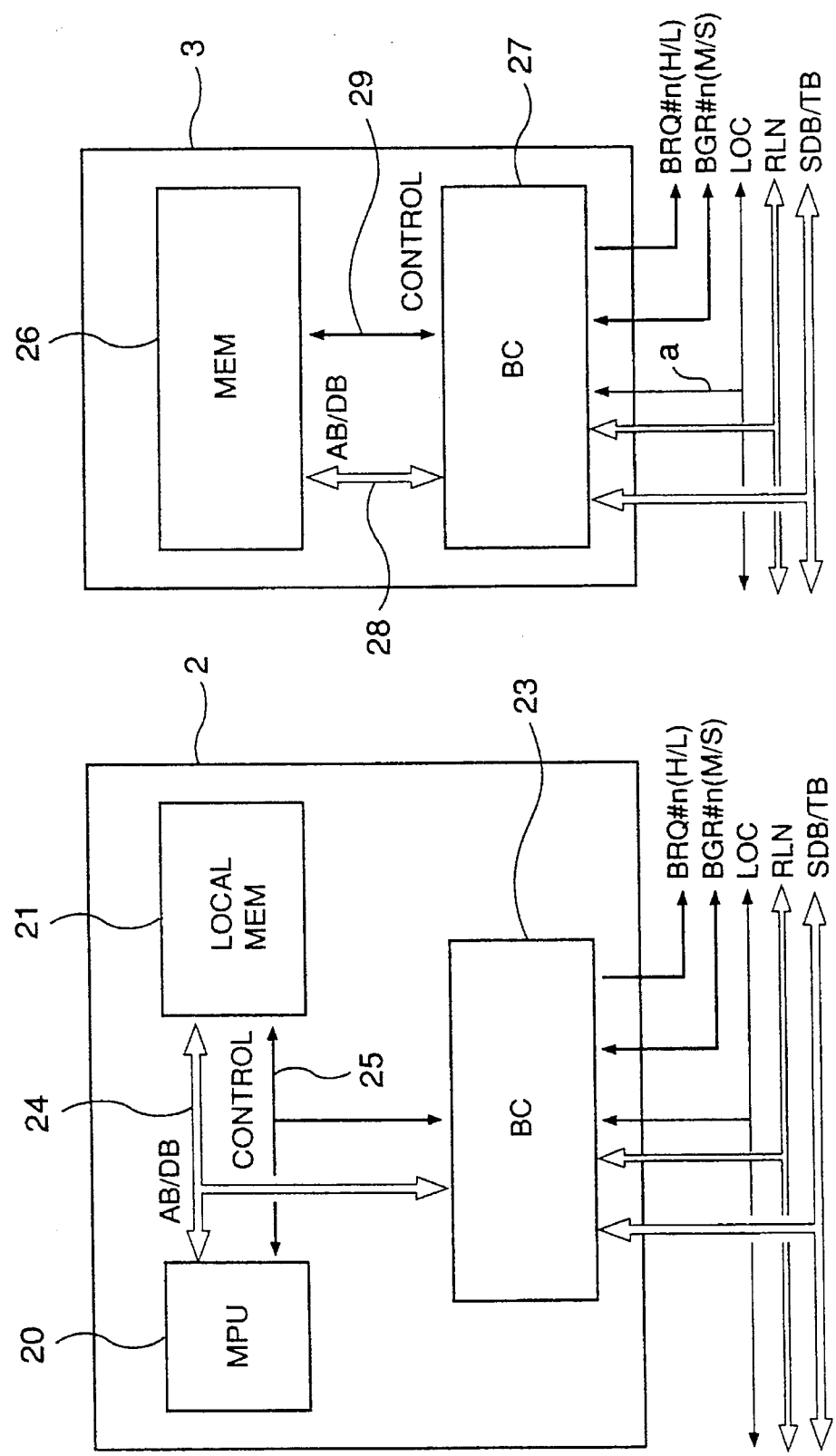
FIG. 10 is a block diagram of a processor module and a memory module among the modules shown in FIG. 9.

FIG. 10 shows the structure of each of the first modules 2 and the structure of each of the second module 3. More particularly, the first modules 2 each having the configuration shown in FIG. 10 are processor modules, and the second modules 3 each having the configuration shown in FIG. 10 are memory modules. The configuration of the processor module 2 shown in FIG. 10 is the same as that of the processor module 2 shown in FIG. 2, while the memory module 3 shown in FIG. 10 differs from the memory module 3 shown in FIG. 2 in that the lock control signal line (LOC) 16 shown in FIG. 10 is connected to the memory module 3, which supervises the lock control signal LOC.

Figure 11:
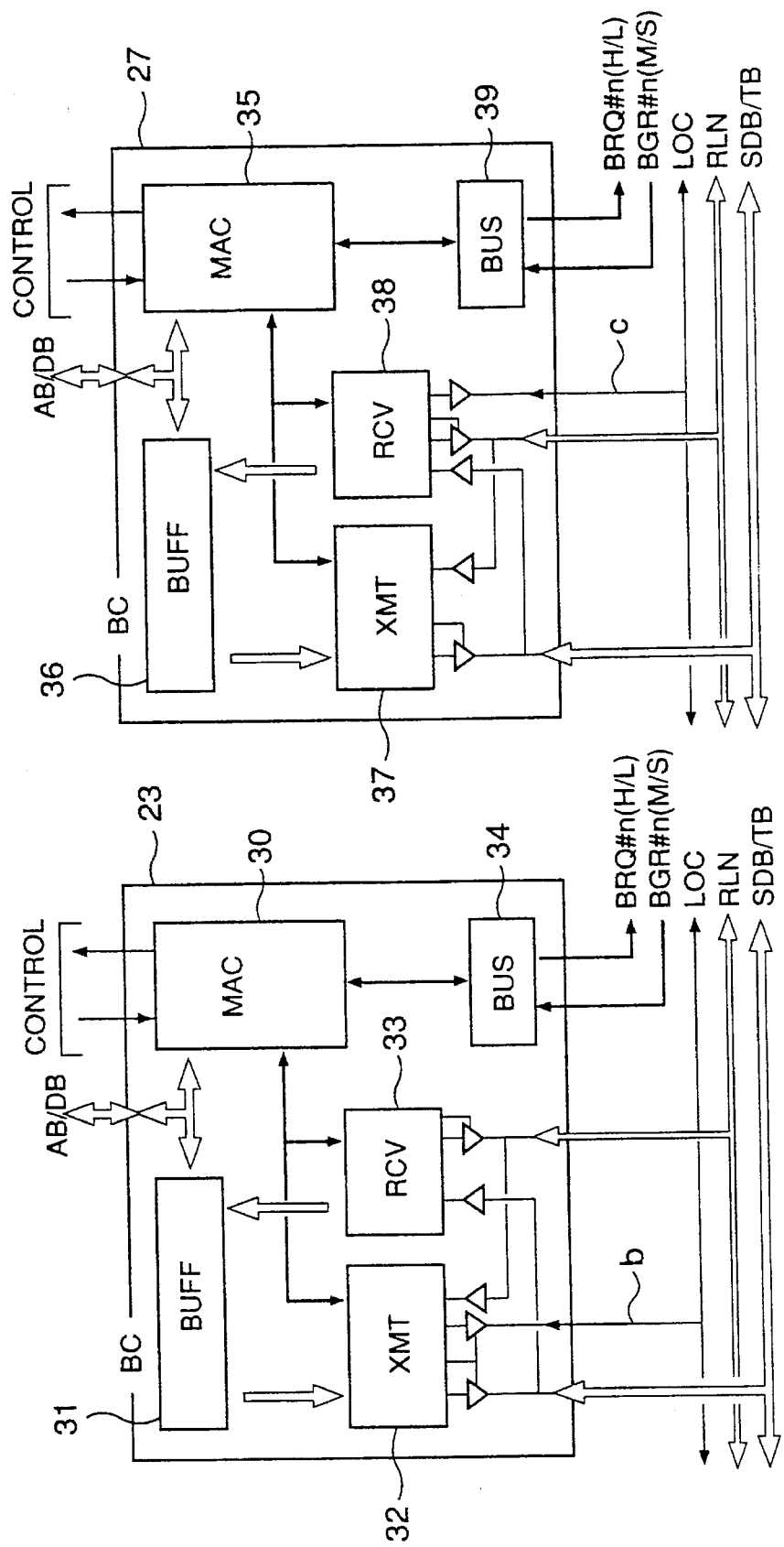
FIG. 11 is a block diagram of a bus controller of the processor module and a bus controller of the memory module shown in FIG. 10.

FIG. 11 shows the bus controller (BC) 23 of the processor module 2 and the bus controller (BC) 27 of the memory module 3. The bus controller 23 of the processor module 2 shown in FIG. 10 differs from that shown in FIG. 3 in that the bus controller 23 shown in FIG. 11 not only output the lock control signal but also supervises the lock control signal, as indicated by symbol "b" shown in FIG. 11. The bus controller 27 of the processor module 3 shown in FIG. 10 differs from that shown in FIG. 3 in that the bus controller 27 shown in FIG. 11 supervises the lock control signal LOC, as indicated by symbol "c" shown in FIG. 11.

Figure 12:
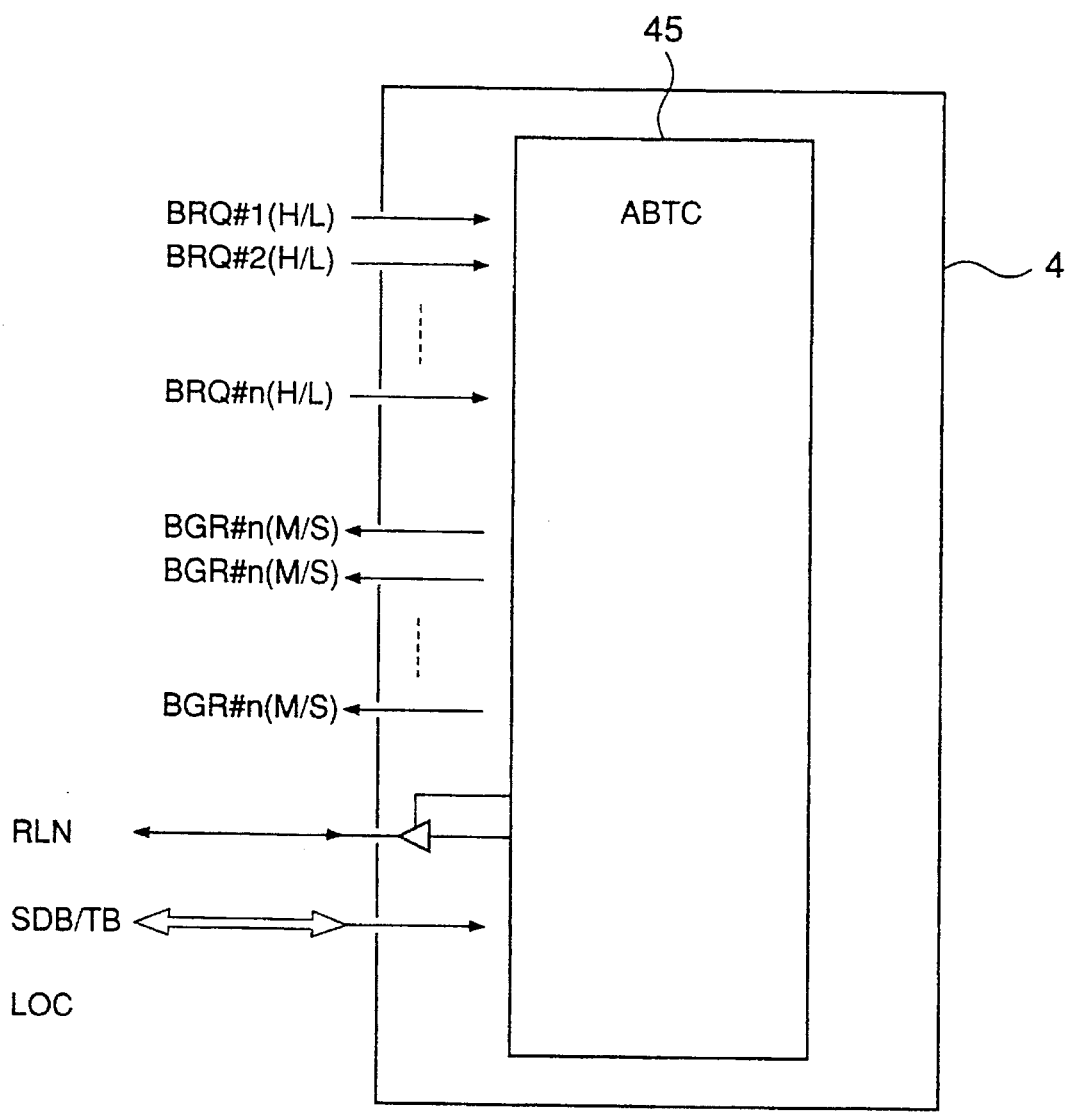
FIG. 12 is a block diagram of an arbiter shown in FIG. 9.

FIG. 12 shows the arbiter controller (ABTC) 45 of the arbiter 4 used in the embodiment of the present invention. As shown in FIG. 12, the arbiter 4 does not receive the lock control signal LOC and thus does not process the lock control. When the system bus 1 is idle with respect to the bus use request signal, the arbiter controller 45 give the right to use the system bus 1 to the module which has generated the above bus use request signal. If the system bus 1 is not idle, the arbiter controller 45 performs a bus arbitration process in which the right to use the system bus is not given to the module.

Figure 13:
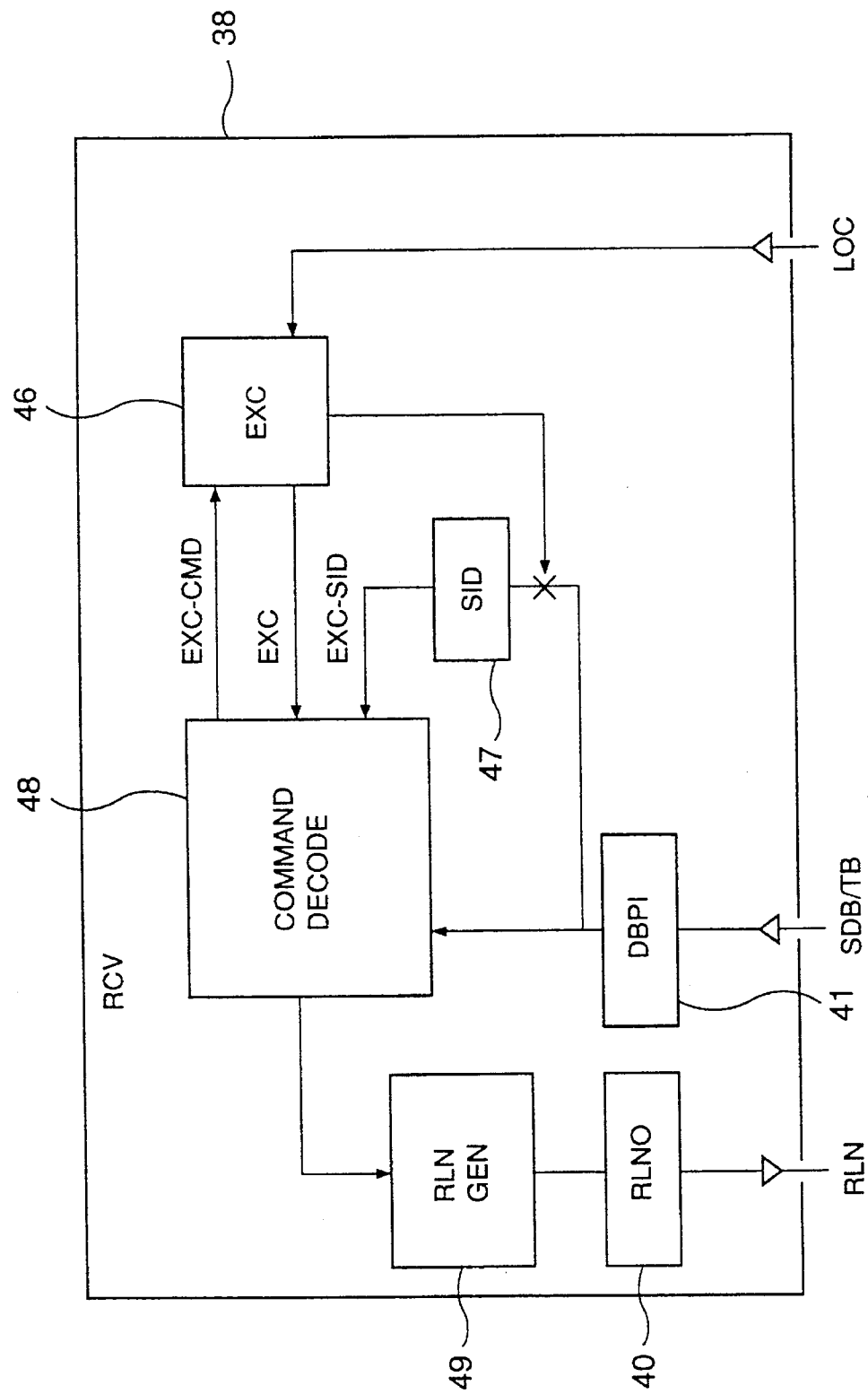
FIG. 13 is a block diagram of a receiver part of the bus controller of the memory module shown in FIG. 11.

FIG. 13 shows a part of the receiver (RCV) 38 provided in the bus controller 23 of each memory module 2. More particularly, the configuration shown in FIG. 13 relates to the lock control. The receiver 38 always supervises the tag bus 14. When the receiver unit 38 detects the starting signal STT for the tag bus 14, a command decoder 48 of the receiver 38 analyzes the received data, and checks the content of the command, the source module and the destination module. If the result of the check shows that the received command is addressed to its own module 2, the command decoder 48 sequentially stores the address information and data subsequent to the command in the buffer 36. Simultaneously, a response (RLN) generator 49 generates coded information indicating the status of receipt of the command, address and data, and outputs the response signal to the response (RLN) bus 15. A latch (RLNO) 40 temporarily stores tile response signal, and a latch (DBFI) 41 temporarily stores the input signal of the tag bus 14.

In order to realize the lock control according to the embodiment of the present invention, the receiver 38 includes an EXC latch 46 for latching an EXC flag indicating that the lock control state is held, and an SID latch 47 for holding a source module identifier (SID) controlled by the EXC flag.

Figure 14:
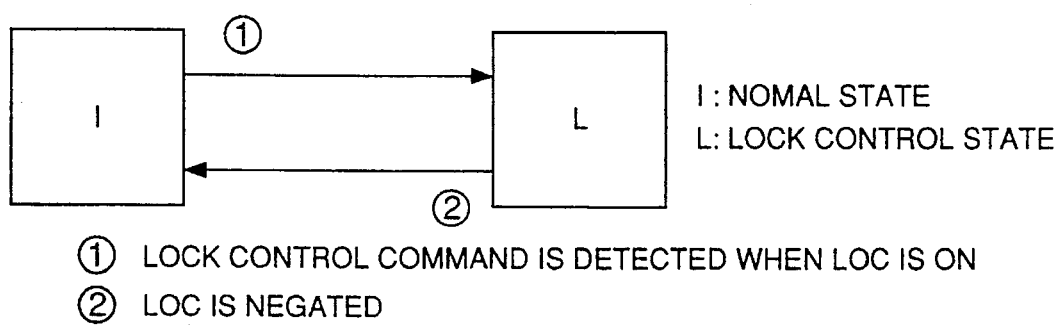
FIG. 14 is a state transition diagram of a lock control flag.

FIG. 14 is a state transition diagram of the EXC flag. The EXC flag is switched to a lock control state (a low (L) level) when it is informed by the command decoder 48 that a command for the lock control is received while the lock control signal is being asserted. The above lock control state of the EXC flag is maintained until the lock control signal is negated. Simultaneously, the source module identification SID indicating the source module which has generated the lock control command is latched in the SID latch 47.

If the next incoming command is the lock control command after the EXC flag is switched to the lock control state, it is checked whether or not the received command coincides with the command latched in the SID latch 47. If both the commands coincide with each other, the incoming command is received. If the commands do not coincide with each other, information indicating that the command cannot be accepted is output to the response bus 15. Each of the memory modules 3 operates in the same manner as described above. Hence, it is possible to ensure a situation in which there is only single lock control command transferred via the system bus 1. That is, if the commands do not coincide with each other, the received command is rejected as an unacceptable command, so that only a single lock control command can be accepted.

However, only with the above-described lock control, there is a possibility that, if execution of lock control commands is frequently generated by a plurality of modules, most of these lock control command accesses may be abnormally terminated. More particularly, the modules are informed, via the response line 15, that the lock access commands cannot be accepted by the memory modules 3, and thus the operations of the modules 2 are interrupted.

If the lock control signal is generated by means of a low-bit-rate element, such as an open-collector element, a bus fight or accessing conflict may not occur. If a tristate element is used to improve the bit rate, a plurality of modules may assert the lock control signals LOG. In the worst case, the tristate element may become damaged due to the bus fight.

Figure 15:
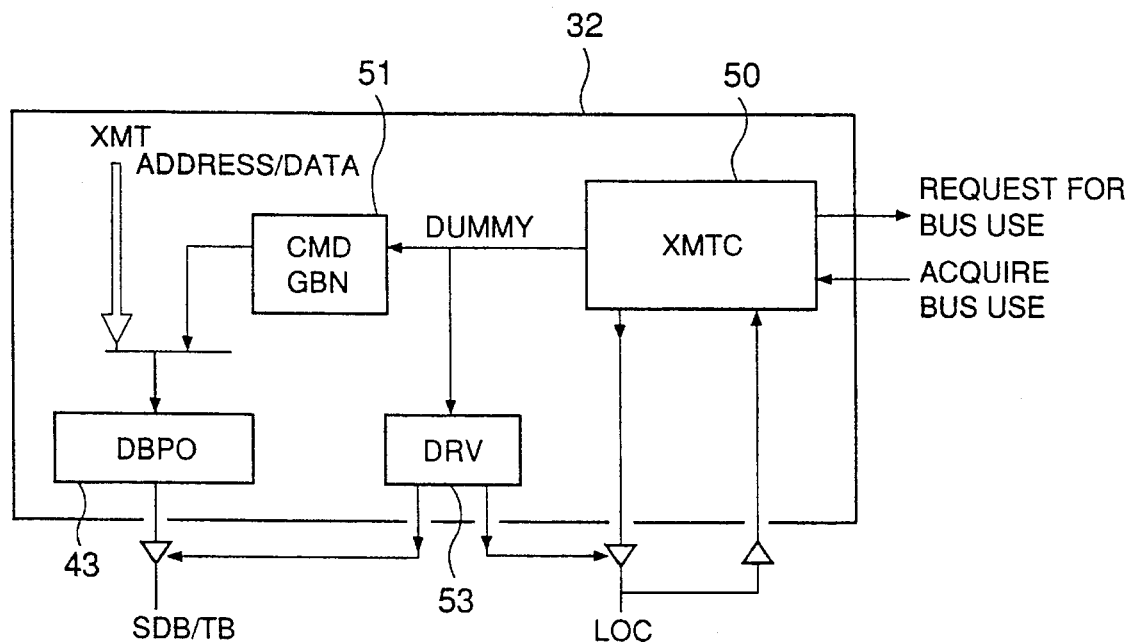
FIG. 15 is a block diagram of the bus controller of the processor module shown in FIG. 11.

FIG. 15 shows the transmitter (XMT) 32 of the bus controller 23 of each processor module 2. A transmission controller (XMTC) 50 supervises the permission process in cooperation with the arbiter 4, and the issuing and supervising of the lock control signal LOG, and requests a command generator (CMDGEN) 51 to issue a dummy command issuing instruction. The latch (DBFO) 43 temporarily holds the dummy command. A driver (DRV) 53 controls the outputting of the dummy command.

As described above, according to the embodiment of the present invention, a path is provided which is used to supervise the lock control signal LOC is provided in the transmitter 32 of the bus controller 23 of each of the processor modules 2. When the bus use permission signal for sending the lock control command is acquired, the dummy command is issued instead of the lock control command if the lock control signal generated by another processor module 2 has been asserted, so that the lock control signal LOC is prevented from being driven. When the memory module 3 receives the dummy command, even if the response signal is output via the response bus 15 as in the case where the normal command is received, in actuality no operation is initiated, so that the dummy command can be substantially neglected. When the transmitter 32 is in the above state, the bus use request signals are not asserted until the lock control signal LOC is negated. When it is detected that the lock control signal LOC has been negated, the bus use request signal is issued again, and reissue of the lock control command is attempted.

According to the embodiment of the present invention, each of the memory modules 3 carries out the lock control (distributed lock control) rather than the arbiter 4, and each of the processor modules 2 supervises the lock control signal LOC. Hence, it becomes possible to avoid collisions of lock control accesses and to carry out ordinary memory accesses without no limitations. As a result, the throughput of the system bus can be improved.

A description will now be given of the formats of the above-mentioned commands and status information on the system bus 1.

FIG. 16 shows the format of the command and the format of the status information used for the memory write access. The command used for the memory write access includes a command word, a memory address word, and one or plural data words. The status information includes status words respectively corresponding to the command word, a memory address word and one or plural data words.

FIG. 17 shows the formats of the command and status information used for the memory word access. The commands for the memory word access include a command word and an address word, and the status information for the memory word access includes a status word and one or plural data words.

In FIGS. 16 and 17, #1, #2 and #3 in the command word and the status word denote code values indicating the types of commands. The code values are fed back to an OPCD area in the status word. A bit R in the commands indicates whether the access is the read operation or write operation, and bits BCT indicate the data length of subsequent data words in the write operation and indicate the data length of read data in the read operation. Symbol "*" indicates reserve bits, and does not indicate any specific meaning. A word MEM-ADDRESS indicates the memory access address, and a word MEM-DATA indicates data to be transferred. Symbol "CSC" stores a code indicating the processing result of the command.

FIG. 18 shows a general definition of the command code. A code value "000" indicates a memory access to the memory, and "011" indicates a register access to a register in the memory module 3. The register access is not directly related to the present invention, and a description thereof will now be omitted.

FIG. 19 shows a definition of the command code according to the embodiment of the present invention. A code value "110" is assigned as the lock memory access command, and is also used as the dummy command. As shown in FIG. 20 showing a command added according to the embodiment of the present invention, a flag (F) bit indicating the dummy command is added to bit #23, which is used as a reserve bit in FIG. 18.

FIG. 21 shows the format of data transferred via the response bus (RLN) 15 in synchronism with the command/ status information. The present embodiment uses nine statuses, as shown in FIG. 21. A value "0000" is a code sent back if there is no module which should receive a command. In actuality, since there is no module for driving the response bus 15, "0000" is always obtained. A value "0110" indicates that the module which should receive a command is carrying out the initializing process and cannot receive any command. A value "0111" is sent back when the module which should receive a command is in the halt state. If the above module detects a serious abnormality itself, the module is switched to the halt state in which the module cannot receive any command. A value "100" is a code sent back when an abnormality on the system bus 1 is detected, and corresponds to a parity error (hardware error) on the bus 13 or 14.

A value "1010" shows a sequence abnormality in which the last word indicated by the complete signal CPT transferred via the tag bus 14 does not correspond to the data length indicated in the command. For example, the sequence abnormality is sent back when some data is lost or added or when the bits BCT are changed. A value "1011" is sent back when the module which should receive a command receives a command that is not supported (reject). For example, the value "1011" is sent back when each processor module 2 mistakenly sends the command to a module. A value "1110" is sent back when a command that has not been processed is stored in the buffer (BUFF) of the module which should receive a command (buffer busy) and the above module cannot accept any command. A value "1110" indicates that a command has been duly accepted and the status information will be sent back after the command is processed (DACK). In the command used for the memory access, the status information is sent back and this code value is sent back in the normal state. A value "1111" is sent back when a command has been duly accepted but the status information has not been returned. The value "1111" is sent back when some predetermined register accesses are carried out and the dummy command of the lock control command according to the embodiment of the present invention is output.

Figure 22:
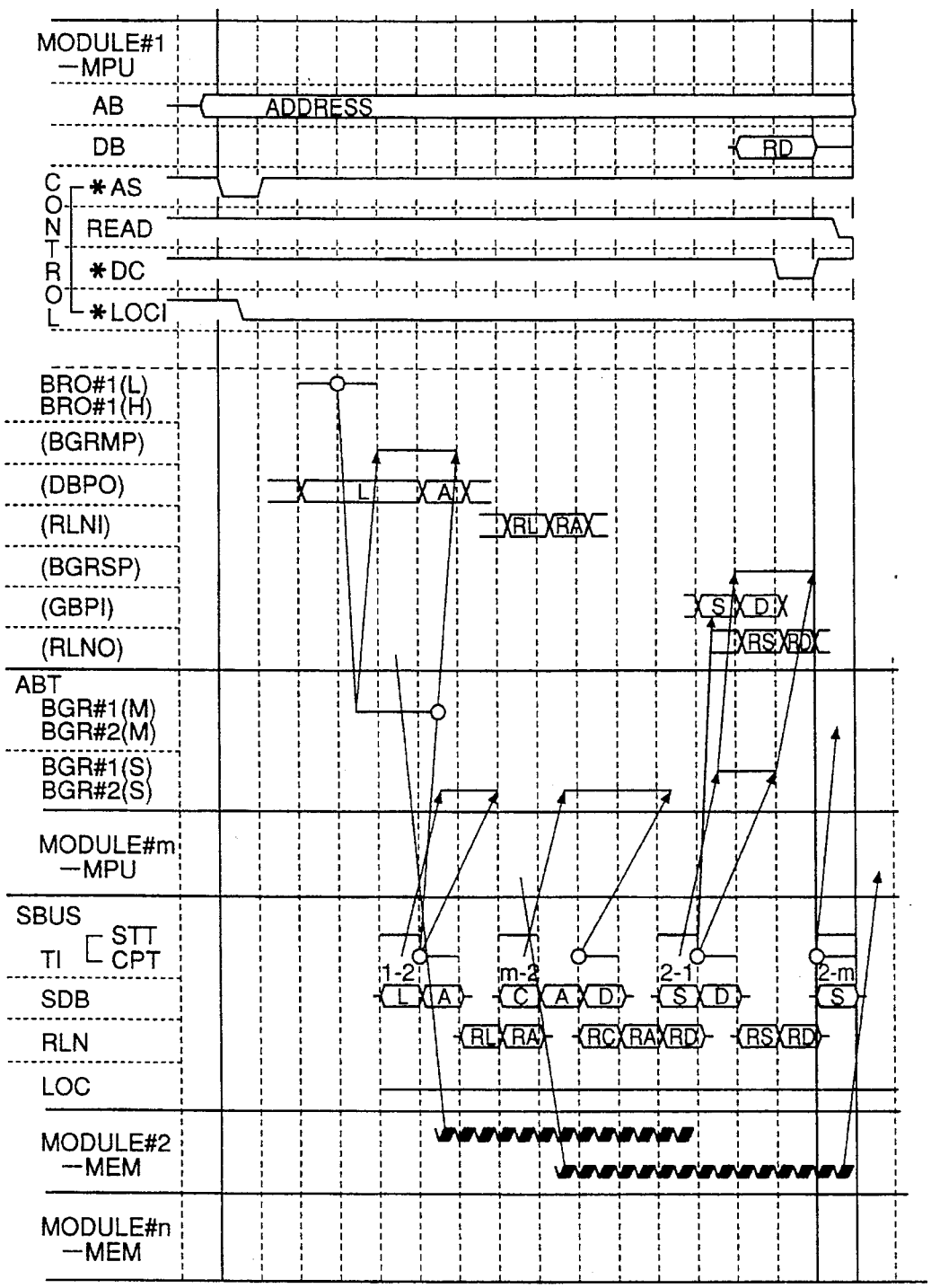
FIG. 22 is a sequence diagram of a read operation according to the embodiment of the present invention.
Figure 23:
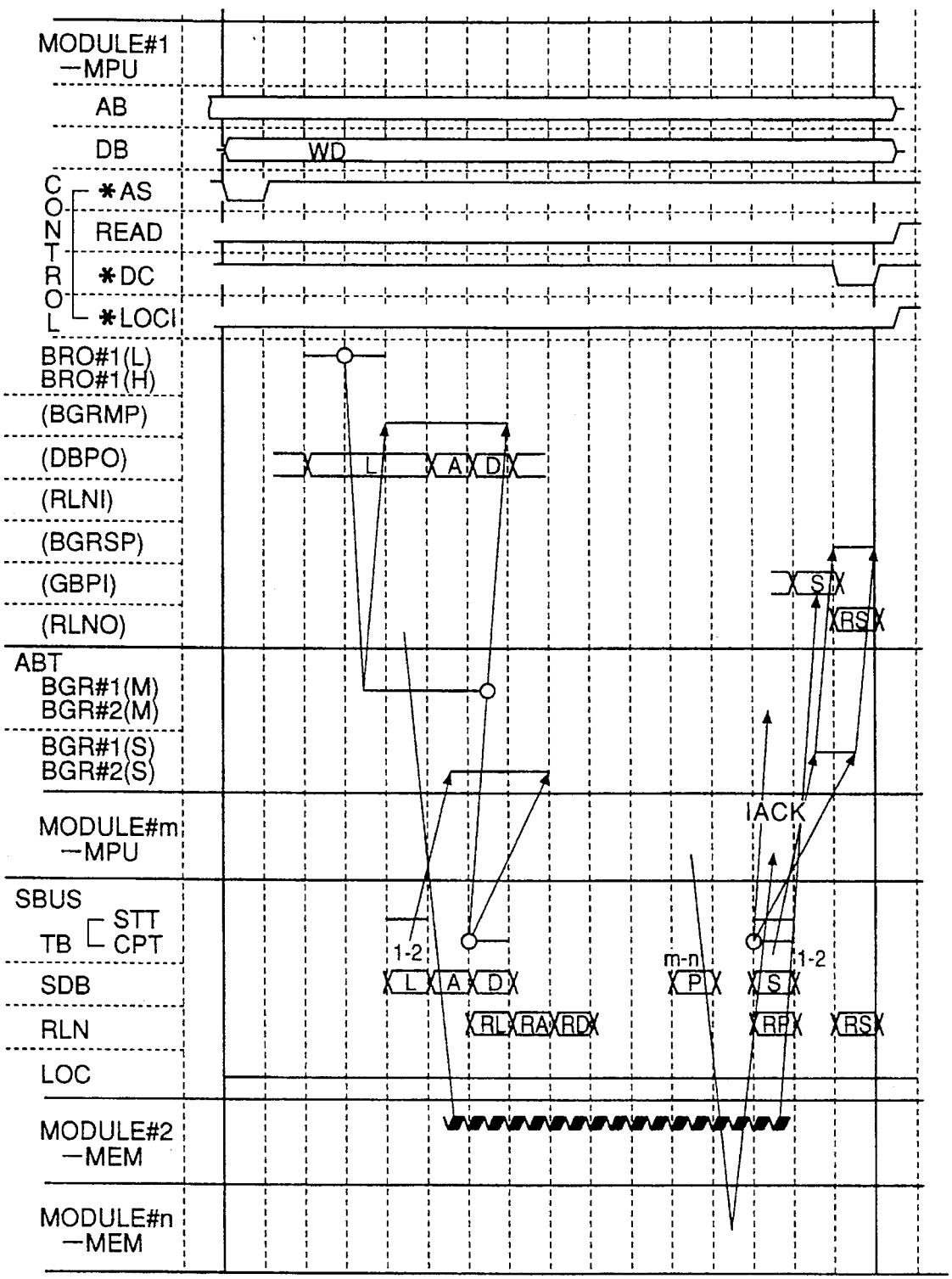
FIG. 23 is a sequence diagram of a write operation according to the embodiment of the present invention.

FIGS. 22 and 23 are timing charts of the system bus 1 during the lock control access according to the embodiment of the present invention. More particularly, FIG. 22 shows a sequence in which module #1 reads data from module #2, and FIG. 23 shows a sequence in which module #1 writes data into module #2. Further, FIGS. 22 and 23 show the operations of the system bus 1 and the arbiter 4 and the lock control access. The operations of the system bus 1 and the arbiter 4 are almost the same as those previously described with reference to FIG. 6. Hence, the lock control access will now be described.

The MPU 20 of module #1 settles the address of the lock control access on the address bus AB, and asserts the address strobe signal (*AS) in order to notify that the bus operation is initiated. When the bus controller 23 recognizes that the above access is a read access to module #2, the bus controller 23 asserts the bus use request signal BRQ#1(L) in order to send a command. The arbiter 4 receives the bus use request signal BRQ#1(L), and sends the bus use permission signal BGR#1(M) to module #1. Upon receipt of the signal BGR#1(M), module #1 starts to drive the buses 13 and 14 and generate the lock control command (L in FIG. 22). This lock control command is output to the buses 13 and 14 together with the address (A shown in FIG. 22). Simultaneously, module #1 asserts the lock control signal LOC.

All the modules connected to the system bus 1 simultaneously start to carry out the lock control, and latch the source module identifier SID (which indicates module #1 in the case being considered). The starting signal STT indicating the start of the bus operation and the complete signal CPT are sequentially output to the tag bus 14. When the arbiter 4 receives the complete signal CPT, tile arbiter 4 negates the bus use permission signal BGR#1(M) with respect to module #1. Further, when the arbiter 4 recognizes receipt of a command by referring to the tag bus information, the arbiter 4 reads the destination module information contained in the received command, and sends the bus use permission signal BGR#2(S) to module #2. Upon receipt of the bus use permission signal BGR#2(S), module #2 drives the response bus 15 to send back items of the receipt status information RL and RA in synchronism with a transfer of the command.

When the command has been sent, the system bus 1 becomes idle, and the arbiter 4 accepts the next command because the arbiter 4 does not refer to the lock control signal LOC. In the embodiment being considered, the bus use request signal from module #m is accepted and the bus use permission signal is sent thereto. The command issued by module #m is a memory write command (C-A-D shown in FIG. 22) addressed to module #2, and is not the subject of the lock control. Further, the buffer 36 of the memory module 3 is not full of data. Hence, the command issued by module #m is accepted. The memory access in module #2 is sequentially carried out. When the lock control access process previously accepted is completed, the status information is generated and is sent back together with data (S-D shown in FIG. 22). Further, when the process of module #m is completed, the corresponding status information is sent back (S shown in FIG. 22). When a transfer of the status information concerning the previous lock control command is completed, the bus controller 23 of module #1 sends back the complete signal *DC to the data bus 24.

Referring to FIG. 23, the MPU 20 starts the write operation, and the bus controller 23 sends the lock control command, address and data (L-A-D). When memory module #2 recognizes the lock control command, it compares the source module identifier SID contained in the received command with the source module indicated by the information previously latched. When both the source module identifiers coincide with each other, module #2 accepts the received command. While module #2 is processing the command, module #m attempts to output the lock control command to module #n (memory module). However, since the lock control signal LOC has been asserted, module #m outputs the dummy command (P shown in FIG. 23). Module #n duly receives the dummy command (IACK). However, in actuality, no operation is carried out and no status information is sent back. Even if the lock control command is issued due to a fault of module #m, the above command is not accepted because modules #n and #m simultaneously shift to the lock control state ("1001" is sent back via the response bus 15).

When the previous lock control write process is completed, the status information is generated and sent back. When module #1 receives the status information, module #1 sends the complete signal *DC to the MPU 20. The MPU 20 completes the command in response to the complete signal *DC, and negates the signal *LOCI. Since the MPU 20 is negated, the lock control signal on the system bus 1 is also negated, so that all the memory modules are released from the lock control.

Figure 24A:
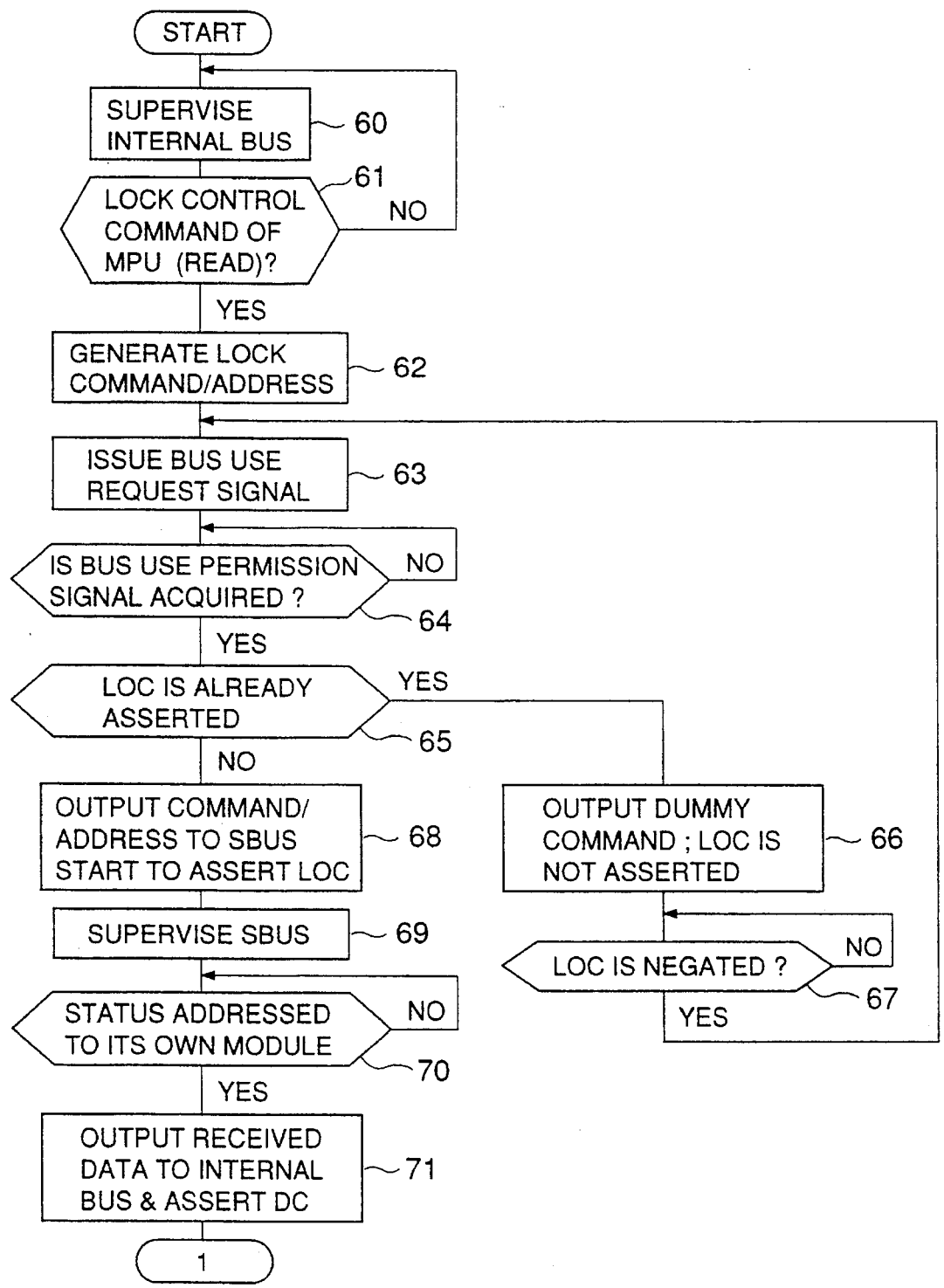
FIGS. 24A and 24B are flowcharts of the operation of the bus controller of the processor module according to the embodiment of the present invention.
Figure 24B:
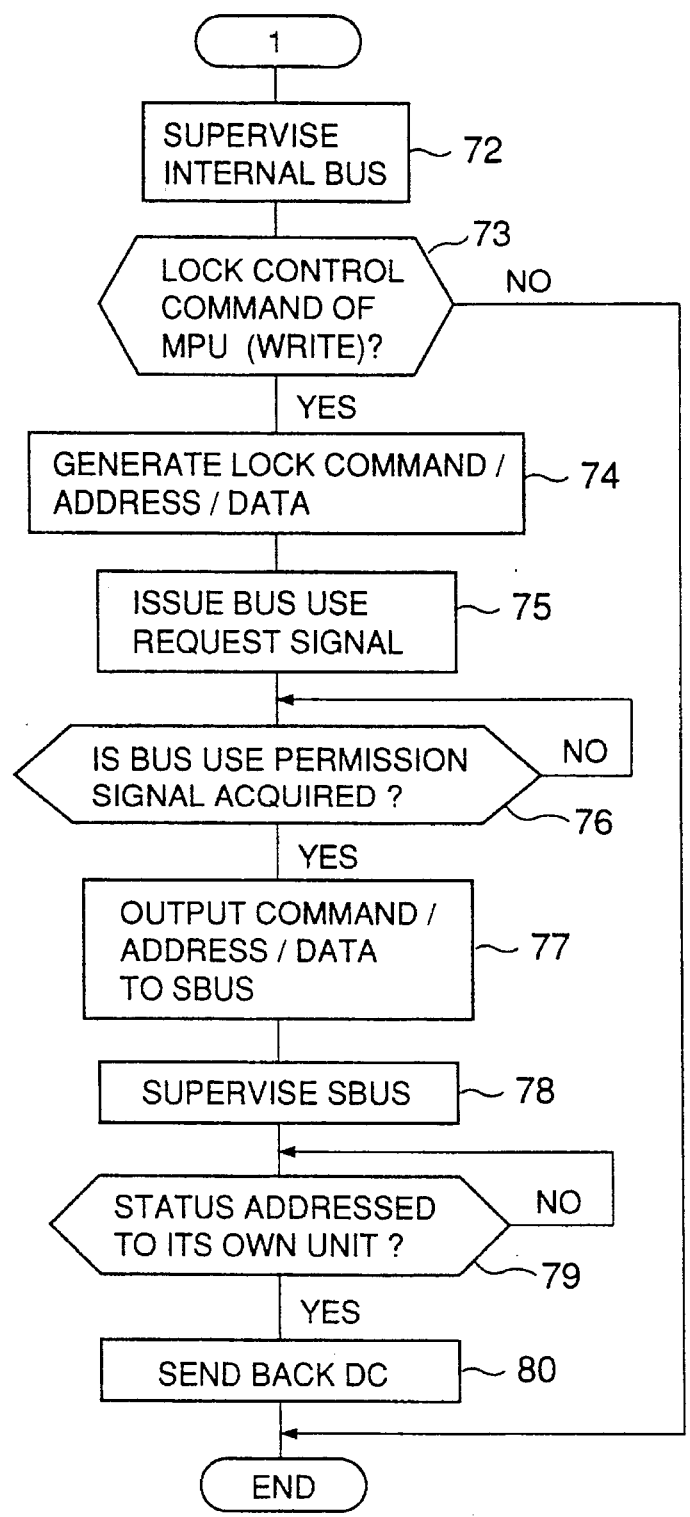

The sequences shown in FIGS. 22 and 23 are carried out according to flowcharts shown in FIGS. 24A, 24B, 25 and 26. FIGS. 24A and 24B are flowcharts of the sequence of sending the commands and receiving the status information by the bus controller 23 of the processor module. The bus controller 23 supervises the buses 24 and 25 (step 60 shown in FIG. 24A). When the bus controller 23 detects the lock control read command from the MPU 20 (step 61), the bus controller 23 generates, from the internal bus information and the destination module identifier, the lock control command and the read address which is to be output to the system bus 1 (step 62).

Then, the bus controller 23 issues the bus use request signal BRQ#1(L) to the arbiter 4 (step 63). When acquiring the bus use permission signal BGR#1(M) (step 64), the bus controller 23 whether or not the lock control signal has been asserted by another processor module 2 (step 65). When it is determined that the lock control signal has been asserted, the bus controller 23 outputs the dummy command instead of the lock control command and thus does not assert the lock control signal (step 66). Then, the bus controller 23 waits for a state in which the lock control signal that has been asserted is negated (step 67). When the above state is detected, the bus controller 23 returns to step S63.

If it is determined that the lock control signal has not been asserted, the bus controller 23 outputs the lock control command and the address to the system bus 1, and asserts the lock control signal (step 68). Then, the bus controller 23 supervises the system bus 1 to wait for a response signal (step 69). When the status information addressed to the module having the bus controller 23 being considered is received (step 70), the bus controller 23 outputs the read data received with the status information to the data bus 24, and sends the complete signal DC indicating the end of the bus operation to the MPU 20 (step 71).

Referring to FIG. 24B, the bus controller 23 supervises the internal buses 24 and 25 again (step 72). When receiving the lock control write command from the MPU 20 (step 73), the bus controller 23 generates, on the basis of the internal bus information and the setting information concerning the write operation, the lock control command, and the write address and write data (step 74). Then, the bus controller 23 issues the bus use request signal to the arbiter 4 (step 75). When receiving the bus use permission signal (step 76), the bus controller 23 outputs the lock control command, the write address and the write data to the system bus 1 (step 77), and waits for a response signal by supervising the system bus 1 (step 78). When the status information addressed to the module having the bus controller 23 being considered is received (step 79), the bus controller 23 outputs the complete signal DC to the internal buses 24 and 25, and reports the MPU 20 to the completion of the bus operation (step 80).

Figure 25:
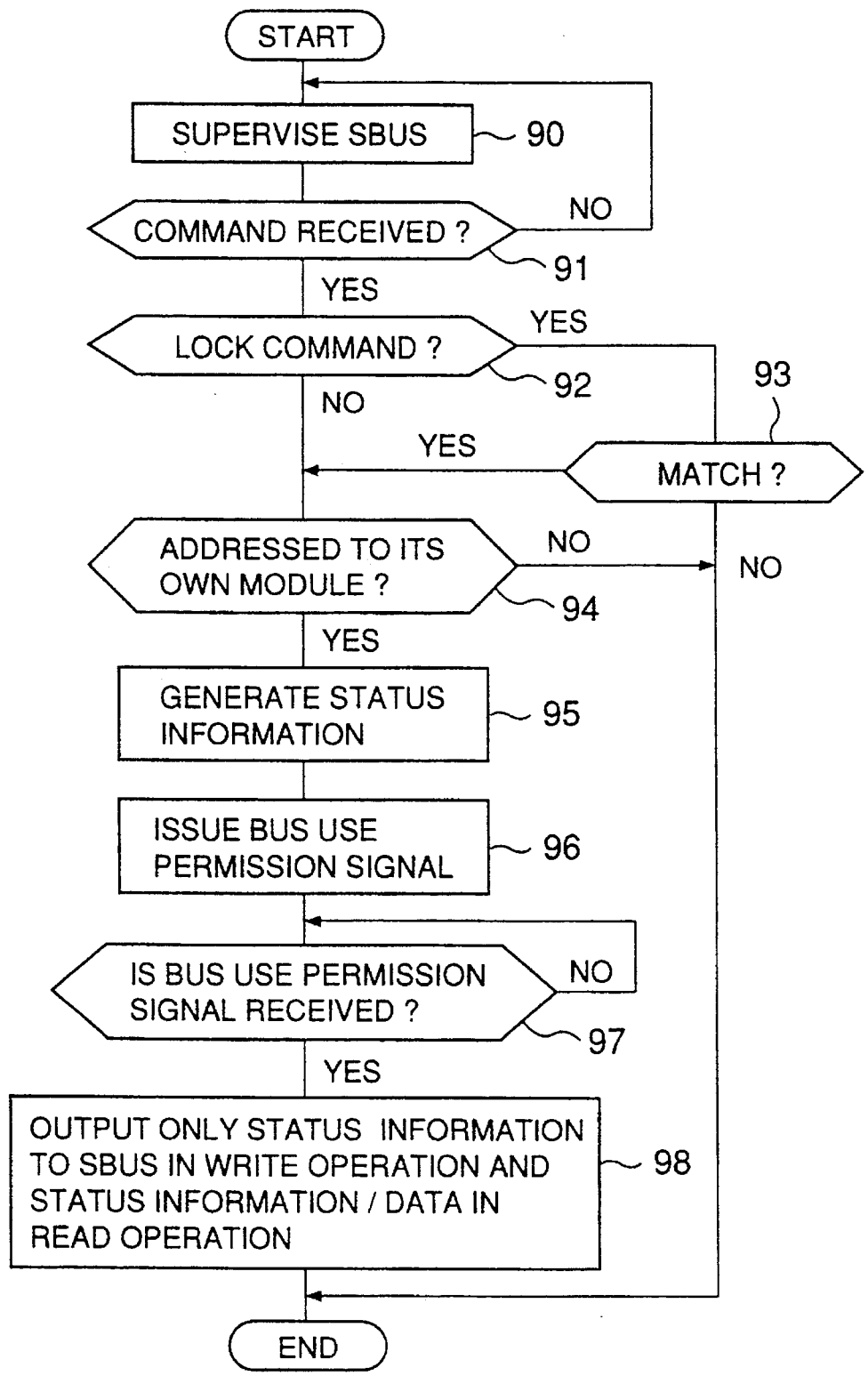
FIG. 25 is a flowchart of the operation of the bus controller of the memory module according to the embodiment of the present invention.

FIG. 25 is a flowchart of the sequence of sending commands and receiving the status information by the bus controller 27 of each of the memory modules. The bus controller 27 supervises the system bus 1 (step 90). When a command is received (step 91), the bus controller 27 determines whether the received command is a lock control command or a general (non-lock control) command (step 92). When it is determined that the received command is a lock control command, the bus controller 27 determines whether or not the source module indicated by the information contained in the received command coincides with the module indicated by the information latched in the SID latch 47 (step 93). When the result of the step 93 determination is affirmative, the bus controller 27 determines whether or not the received command is addressed to the module having the bus controller 27 being considered (step 94).

When the result of step 94 is affirmative, the bus controller 27 executes the command, and generates the status information based on the result of execution of the command (step 95). Then, the bus controller 27 sends the bus use request signal to the arbiter 4 (step 96). Upon receipt of the bus use permission signal (step 97), the bus controller 27 outputs only the status information when the command is a write command to the system bus 1, and outputs the status information and read data thereto when the command is a read command (step 98).

Figure 26:
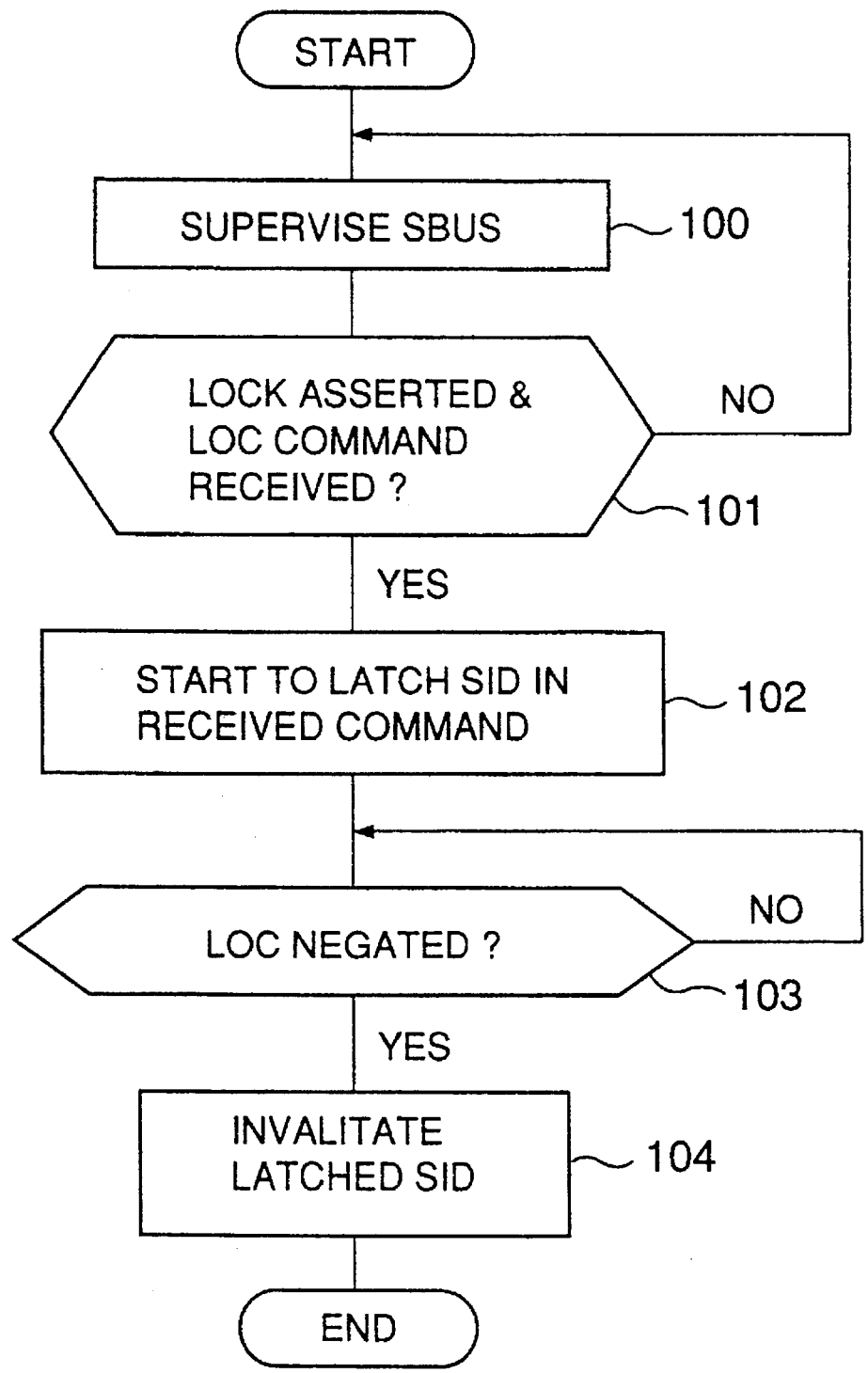
FIG. 26 is another flowchart of the operation of the bus controller of the memory module according to the embodiment of the present invention.

FIG. 26 is a flowchart of the sequence of latching the source module identifier SID by the bus controller 27 of each memory module. The bus controller 27 supervises the system bus 1 (step 100). When the bus controller 27 detects a situation that the lock control signal has been asserted and a lock control command is received (step 101), the bus controller 27 latches the source module identifier SID sending the lock control command in the SID latch 47 (step 102), and supervises whether or not the lock control signal LOC is negated (step 103). When it is determined that the lock control signal LOC has been negated, the bus controller 27 invalidates the source module identifier latched in the SID latch 47 (step 104).

The present invention is not limited to the specifically disclosed embodiments, and variations and modifications may be made without departing from the scope of the present invention.

What is claimed is:

1. A system bus control system for a system having a plurality of first modules and at least one second module, said first and second modules being connected together via a system bus, said system bus being controlled by an arbiter receiving requests to use the system bus from the first and second modules, said system bus control system comprising:

first lock control signal supervising means, provided in each of the plurality of first modules, for supervising a lock control signal indicating that a lock control is being carried out;

lock control signal outputting means, provided in each of the plurality of first modules, for outputting said lock control signal to the system bus;

command outputting means, provided in each of the plurality of first modules, for outputting a lock control command and a non-lock control command, the lock control command including source module information indicating a source module outputting the lock control signal;

response receiving means, provided in each of the plurality of first modules, for receiving a response to the lock control command or the non-lock control command;

second lock control signal supervising means, provided in said at least one second module, for supervising the lock control signal;

source module information storing means, provided in said at least one second module, for storing said source module information, said source module information storing means including latch means for causing the second lock control signal supervising meads to hold the source module information included in the lock control command which is received after the lock control signal is asserted, until the lock control signal is negated;

command receiving means, provided in said at least one second module, for receiving said lock control command and said non-lock control command;

response output means for outputting said response to the system bus; and control means, provided in said arbiter, for receiving the requests from the first and second modules and for permitting one of the first and second modules to use the system bus on the basis of a status of the system bus.

2. The system bus control system as claimed in claim 1, wherein said command receiving means comprises means for rejecting the lock control command if the source module indicated by the source module information included in the lock control command does not coincide with the source module indicated by the source module information held in the source module information storing means.

3. The system bus control system as claimed in claim 1, wherein said arbiter comprises means for determining whether or not the system is idle and for permitting one of the first and second modules to use the system bus when it is determined that the system bus is idle.

4. The system bus control system as claimed in claim 1, wherein:

said plurality of first modules comprise processor modules; and said one or plurality of second modules comprise memory modules.

5. A system bus control system for a system having a plurality of first modules and at least one second module, said first and second modules being connected together via a system bus, said system bus being controlled by an arbiter receiving requests to use the system bus from the first and second modules, said system bus control system comprising:

first lock control signal supervising means, provided in each of the plurality of first modules, for supervising a lock control signal indicating that a lock control is being carried out;

lock control signal outputting means, provided in each of the plurality of first modules, for outputting said lock control signal to the system bus;

command outputting means, provided in each of the plurality of first modules, for outputting a lock control command and a non-lock control command, the lock control command including source module information indicating a source module outputting the lock control signal;

response receiving means, provided in each of the plurality of first modules, for receiving a response to the lock control command or the non-lock control command;

second lock control signal supervising means, provided in said at least one second module, for supervising the lock control signal;

source module information storing means, provided in said at least one second module, for storing said source module information;

command receiving means, provided in said at least one second module, for receiving said lock control command and said non-lock control command, said command receiving means including means for rejecting the lock control command if the source module indicated by the source module information included in the lock control command does not coincide with the source module indicated by the source module information held in the source module information storing means;

response output means for outputting said response to the system bus; and control means, provided in said arbiter, for receiving the requests from the first and second modules and for permitting one of the first and second modules to use the system bus on the basis of a status of the system bus.

6. A system bus control system for a system having a plurality of first modules and at least one second module, said first and second modules being connected together via a system bus, said system bus being controlled by an arbiter receiving requests to use the system bus from the first and second modules, said system bus control system comprising:

first lock control signal supervising means, provided in each of the plurality of first modules, for supervising a lock control signal indicating that a lock control is being carried out;

lock control signal outputting means, provided in each of the plurality of first modules, for outputting said lock control signal to the system bus;

command outputting means, provided in each of the plurality of first modules, for outputting a lock control command and a non-lock control command, the lock control command including source module information indicating a source module outputting the lock control signal;

response receiving means, provided in each of the plurality of first modules, for receiving a response to the lock control command or the non-lock control command;

second lock control signal supervising means, provided in said at least one second module, for supervising the lock control signal;

source module information storing means, provided in said at least one second module, for storing said source module information;

command receiving means, provided in said at least one second module, for receiving said lock control command and said non-lock control command;

response output means for outputting said response to the system bus; and control means, provided in said arbiter, for receiving the requests from the first and second modules and for permitting one of the first and second modules to use the system bus on the basis of a status of the system bus, each of said plurality of first modules including means for issuing a dummy command and for preventing the first modules generating said dummy command from issuing the lock control signals, when each of the first modules attempts to issue the lock control signal and the lock control command recognizes that the lock control signal has been issued by another module based on the lock control signal supervising means.

7. The system bus control system as claimed in claim 6, wherein each of said first modules which have issued the dummy command does not newly issue the lock control command until the lock control signal which has been issued is negated.

* * * * *

UNITED STATES PATENT AND TRADEMARK OFFICE
CERTIFICATE OF CORRECTION

PATENT NO. : 5,517,625
DATED : May 14, 1996
INVENTOR(S) : Hajime TAKAHASHI

It is certified that error appears in the above-indentified patent and that said Letters Patent is hereby corrected as shown below:

Column 8

\*Line 35, before "the" (second occurrence), insert --issue--;

\*Line 43, "generate" should be --generated--.

\*Line 53, delete "shown in" (second occurrence);

Column 9

\*Line 9, "output" should be --outputs--;

Line 42, "tile" should be --the--;

Column 15

Line 32, "meads" should be --means--.

Signed and Sealed this

First Day of October, 1996

Attest:

BRUCE LEHMAN

*Attesting Officer*   *Commissioner of Patents and Trademarks*